United States Patent [19]

Sato et al.

[11] 4,366,263
[45] Dec. 28, 1982

[54] EXPANDED CROSS-LINKED POLYETHYLENE PARTICLE, A MOLDED PRODUCT THEREOF AND THE METHODS THEREOF

[75] Inventors: Eiya Sato; Tsukasa Yamagishi, both of Suzuka, Japan

[73] Assignee: Asahi-Dow Limited, Tokyo, Japan

[21] Appl. No.: 213,643

[22] Filed: Dec. 5, 1980

[30] Foreign Application Priority Data

| Dec. 10, 1979 | [JP] | Japan | 54-160144 |
|---|---|---|---|
| Apr. 25, 1980 | [JP] | Japan | 55-55000 |
| Apr. 25, 1980 | [JP] | Japan | 55-55001 |
| Apr. 25, 1980 | [JP] | Japan | 55-55002 |
| Apr. 25, 1980 | [JP] | Japan | 55-55003 |
| Apr. 25, 1980 | [JP] | Japan | 55-55004 |
| Apr. 26, 1980 | [JP] | Japan | 55-55809 |
| Jun. 30, 1980 | [JP] | Japan | 55-88611 |
| Jun. 30, 1980 | [JP] | Japan | 55-88612 |
| Jun. 30, 1980 | [JP] | Japan | 55-88613 |
| Oct. 20, 1980 | [JP] | Japan | 55-146535 |

[51] Int. Cl.$^3$ .............. C08J 9/22; C08J 9/24
[52] U.S. Cl. ............... 521/60; 264/53; 264/55; 264/DIG. 9; 264/DIG. 15; 264/DIG. 18; 521/56; 521/58; 521/96; 521/143
[58] Field of Search .............. 521/56, 60, 143

[56] References Cited

U.S. PATENT DOCUMENTS

| 2,823,213 | 7/1974 | Stastey et al. | 521/95 |
|---|---|---|---|
| 2,948,664 | 8/1960 | Rubens et al. | 521/60 |
| 3,616,365 | 10/1971 | Stastny et al. | 521/60 |
| 3,709,806 | 1/1973 | Minami et al. | 521/60 |
| 3,743,611 | 7/1973 | Muroi et al. | 521/56 |
| 3,953,558 | 4/1976 | Hatano et al. | 521/56 |
| 3,959,189 | 5/1976 | Kitamori | 521/60 |
| 4,108,934 | 8/1978 | Rubens et al. | 521/56 |
| 4,247,650 | 1/1981 | Shimizu et al. | 521/56 |
| 4,275,023 | 6/1981 | Shimizu et al. | 521/56 |

*Primary Examiner*—Morton Foelak
*Attorney, Agent, or Firm*—Armstrong, Nikaido, Marmelstein & Kubovcik

[57] ABSTRACT

An expansion-molded product made from expanded cross-linked polyethylene particles each of which has an outer skin and inner cellular core, said outer skin each being fused and welded together to form an interfacial membrane whose average thickness is as thick as at least three times that of a cell membrane of the inner cellular core, is prepared by charging a lot of the particles into a mold, heating the particles therein to such an extent that the space among the particles is filled and then aging thus obtained molded product.

The expanded particle each has a structure having an outer skin on an inner cellular core, the outer skin being as thick as at least three times cell membrane of the inner cellular core. The expandable particles are prepared by impregnating a foaming agent into the cross-linked polyethylene particles and heating so that the expandable particles are subjected to a step in which the foaming agent existing in the surface thereof is preferentially forced to evaporate.

3 Claims, 27 Drawing Figures

EXPANDED CROSS-LINKED POLYETHYLENE PARTICLE, A MOLDED PRODUCT THEREOF AND THE METHODS THEREOF

This invention relates to a novel expanded cross-linked polyethylene particle, a molded product thereof and method for producing same.

It is previously known to form an expanded cross-linked polyethylene particle by cross-linking a polyethylene particle to constitute a cross-linked polyethylene particle and charging a foaming agent thereto, and to produce an expanded cross-linked polyethylene molded product of a shape exactly resembling a mold by putting said expanded cross-linked polyethylene particles into a mold and heating the particles to expand and fuse and weld them together, and also to successively heating and drying thus obtained molded product as required.

Practically, there are various methods for productions mentioned above. For instance, a suspension cross-linking method for obtaining homogeneous expanded cross-linked polyethylene particles is disclosed in U.S. Pat. No. 3,886,100, whereas U.S. Pat. No. 3,504,068 indicates a method to obtain a molded product by compressing expanded particles with gas pressure up to 90 to 80% of the original bulk volume and utilizing this compression as an expandability in the mold, when expanded cross-linking polyethylene particles with electron beams and expanding and thermally fusing them in the mold. What is of note as a means to impart an expandability in the mold mentioned above is known, for instance, as the method to chemically compress the expanded particles in the mold (French Pat. No. 2008087), and as the method to hold the expanded particles under high temperature and high pressure conditions and raise the inner gas pressure thereof above 1.18 atmospheres (U.S. Pat. No. 3,953,558).

Thus obtained molded products are widely used as thermal insulating materials in houses, vessels and automobiles, cushioning materials for packagings, transportation, mats, and packings, and also as decorative pieces, toys and buoys.

When producing, however, expanded products suited to such applications actually, sufficiently satisfactory characteristics are not always obtained, so that the demands thereof are inevitably limited.

For example, when used as buoys, the magnitude of buoyancy significantly drops while in use; when used as ornaments or toys, the surface may be shaded due to multiple cavities caused among particles in the molded product surface and the surface lacks gloss, which results in lowering of commercial value of the appearance; when used as insulating materials, gradual reduction of thermal insulating property with the passing of the time is obvious, and the total dimensions shrink about 4 to 7% by length when the surface of molded product is exposed to high temperatures exceeding 70° C., especially in the case of roofing materials, and gaps are produced between units, so that the role of thermal insulation may be null; and when used as cushioning materials, since the thermal resistant compressive creep is insufficient, the cushioning ability may be lost, for example, during transportation of products, possibly leading to damage of products.

Moreover, when producing packages, shock absorbing containers and thermal insulating storage boxes, uneven expanding within a mold and shrinkage may take place in intricate structures consisting of thick wall parts and thin wall parts, so that an exact copy of the mold may not be obtained. Yet, such products may lack cushioning property and thermal insulating property.

It was therefore considered that the aforementioned defects might be due to insufficiency of expandability of expanded particles fused and bonded in a mold. As a result of various studies in this regard, a novel expanded cross-linked polyethylene particle capable of expanding sufficiently without requiring any imparted expandability, namely, having a self-expandability, was successfully developed. Further studies on the molding method suited to this novel particle finally led to the accomplishment of the present invention.

The ultimate objective of this invention is accordingly expressed by the main five objects given below.

That is, the first object is to present a molded product of excellent appearance, substantially free from recesses or cavities among particles constituting the surface skin of molded product, and having sufficient smoothness and gloss. The second object is to present a molded product superior in fusion-bonding strength of particles inside and outside of the molded product and not causing secular deterioration of buoyancy. The third object is to present a molded product excelling in cushioning property even under low density state and possessing an excellent thermal resistant compressive creep property. The fourth object is to present a molded product superior in persistence of thermal insulating property withstanding a duration of days and having an excellent dimensional stability withstanding a thermal history. The fifth object is to present varied molded products having smooth surface, free from shrinkage or edge defect, and being endowed with various characteristics such as compressive strength, cushioning properties and water absorbing resistance, even when molded in complicated shapes and dimensions.

Further supplementary objects relate to this invention. More particularly, the sixth object is to present a novel expanded cross-linked polyethylene particle capable of achieving previous five objects; the seventh object is to present a production method of expanded cross-linked polyethylene particles satisfying the sixth object; and the eighth object is to present a production method of molded products capable of achieving the first to fifth objects.

These objects may be easily accomplished by the present invention.

In the accompanying drawings.

Hereinafter are described the contents of this invention while referring to the attached drawings and diagrams.

In the first place, an expanded cross-linked polyethylene particle relating to the invention is explained.

The expanded cross-linked polyethylene particle of this invention possesses surface skin thereof consisting of a constitution of a higher hardness than the internal structure, and it differs from existing expanded cross-linked polyethylene particles in that it has an easily distinguishable pearly surface gloss.

Figure 2:
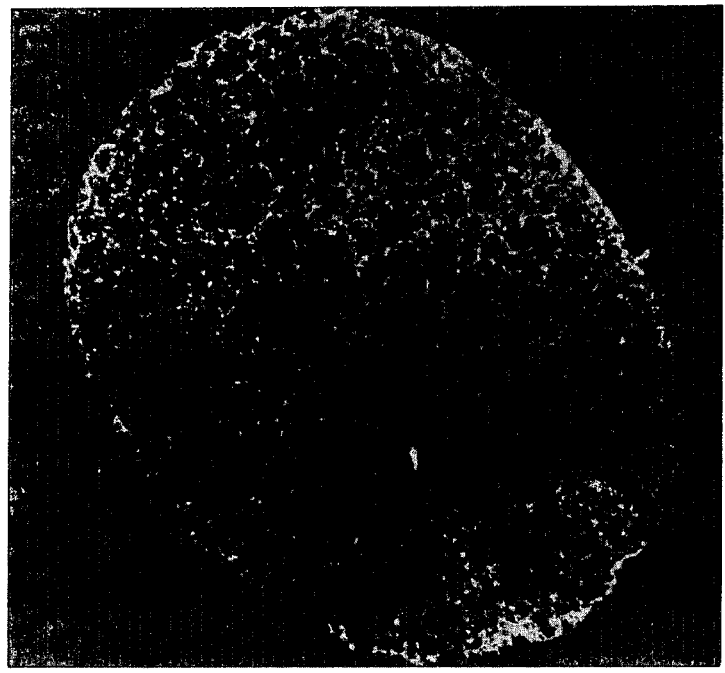
FIGS. 1 and 2 show microscopic photographs of partial cross section of the surface part of the present expanded particle and that of the conventional particle, respectively.
Figure 1:
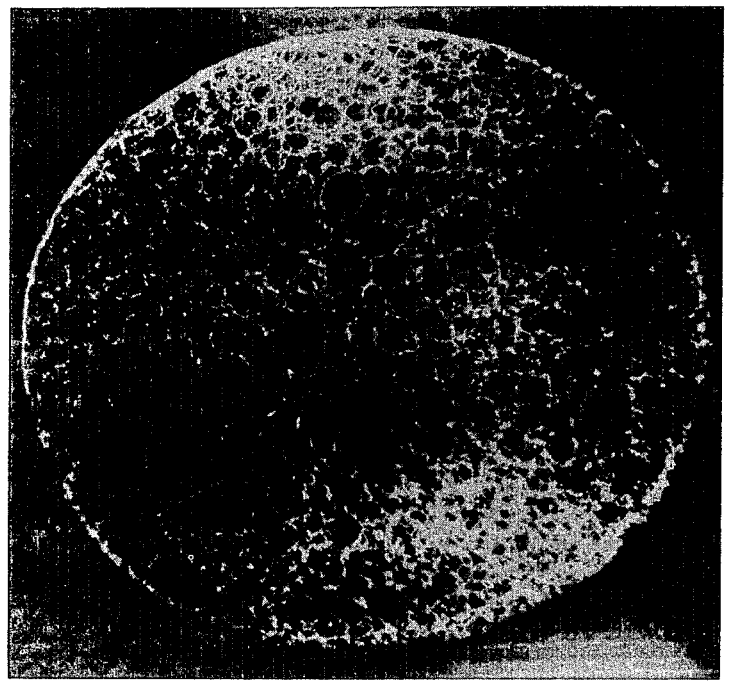

FIGS. 1 and 2 are enlarged photographs magnified×23) of cross-section of the present and conventional expanded cross-linked polyethylene particles, respectively. The difference between the two is evident. In the conventional expanded particle (FIG. 2), the membrane of inner cellular core and that of the outer skin are almost uniform, and size and shape of cells are generally similar, and since the cells composing the surface maintain the original shape, the particle surface is undulated in correspondence with the membrane of the cells, while in the expanded particle of the present invention (FIG. 1), cells composing the particle surface are smaller and flatter as compared with those of inner core, and cells constituting the particle vary significantly in size and the membrane of cell composing the surface is thicker than that of conventional ones, so that the particle surface is covered with an outer skin of relatively large thickness. Smoothness of the outer skin on the particle surface may be felt by touching. When touching the surface of the conventional expanded particle, one may feel slight roughness on soft surface; in the case of the expanded particle of this invention, one may feel a certain smoothness on a slightly stiff and elastic surface. Moreover, when piercing through the surface of the particle by using a setting pin with a slightly blunt point, the pin penetrates into the conventional particle with no resistance felt on fingers at all, whereas the pin gets into the particle of the present invention with a slight resistance felt on fingers, giving off a small rupture sound. It may be hence estimated that an outer skin differeing in constitution from the internal structure is composed in the latter case.

Figure 3:
FIGS. 3 and 4 show enlarged microscopic photographs of the surface part of the particles corresponding to FIGS. 1 and 2, respectively.
Figure 4:

FIGS. 3 and 4 are further enlarged photographs (magnified×250) of the surface portion of the expanded particle of the present invention and of the conventional expanded particle, respectively.

In FIG. 4, the membrane thicknesses of cell on the particle surface are almost similar to that of inside cell of the particle; in FIG. 3, on the other hand, the membrane thickness of the outer skin of the particle is clearly larger than that of the inside, approximately by not lower than three times.

The inventors of the present invention, accordingly, in order to study the difference between said two expanded particles, attempted to quantitatively determine the value of smoothness (S).

The smoothness (S) of particle preferred to here is a factor representing the evenness due to cells on the particle surface, and it is 1.00 in the case of an ideal smooth surface completely free from unevenness due to cells. Comprehensively, the closer to 1.00 the smoothness (S), the smoother is the surface of a particle.

The smoothness (S) may be determined as follows.

Figure 5:
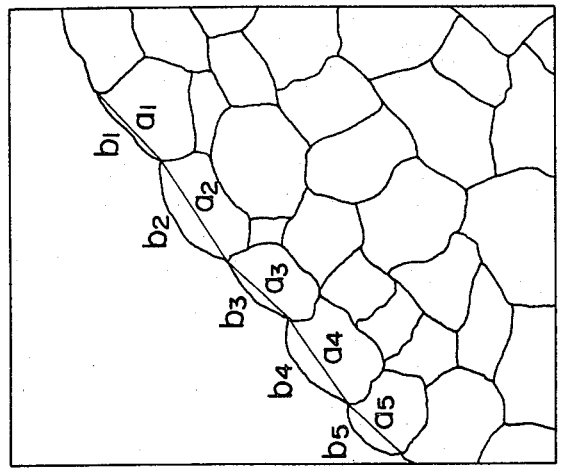
FIG. 5 is a schematic diagram for calculation of smoothness (S).

First, an expanded particle is cut to a thin slice of about 20 microns in thickness, and the cross-section thereof is microscopically photographed (magnified×250) by focusing on the contour of the surface, in particular. As shown in a model in FIG. 5, contact points with cells adjoining to the contour are connected with straight lines in each cell, and the sum ($\Sigma a$) of lengths of lines of each cell, a1, a2, a3 ..., and the sum ($\Sigma b$) of actual lengths of surface layer portion of each cell b1, b2, b3 ... are calculated, and the ratio $\Sigma b/\Sigma a$ is determined, which is the smoothness S.

In order to examine the correlation between the smoothness thus obtained and the gloss, expanded cross-linked polyethylene particles having various smoothnesses were evaluated by the naked eye observation by five adult men having normal color sense. The results are shown in Table 2 appearing in Example 2 hereinafter. In this table, the estimated points were determined as follows: 4 points were given when high gloss was felt; 3 points when some gloss was felt; 2 points when scarce gloss was felt; and 1 point when no gloss was felt at all.

Thus it can be understood that the numerical value of smoothness (S) perfectly coincides with the estimated value obtained by the naked eye observation. All observers gave the estimation that gloss was felt on samples having the numerical value of not higher than 1.05; all of those samples were expanded particles of the present invention, and it can be seen from this result that the expanded particles of the present invention are obviously distinguished from conventional ones.

Figure 6:
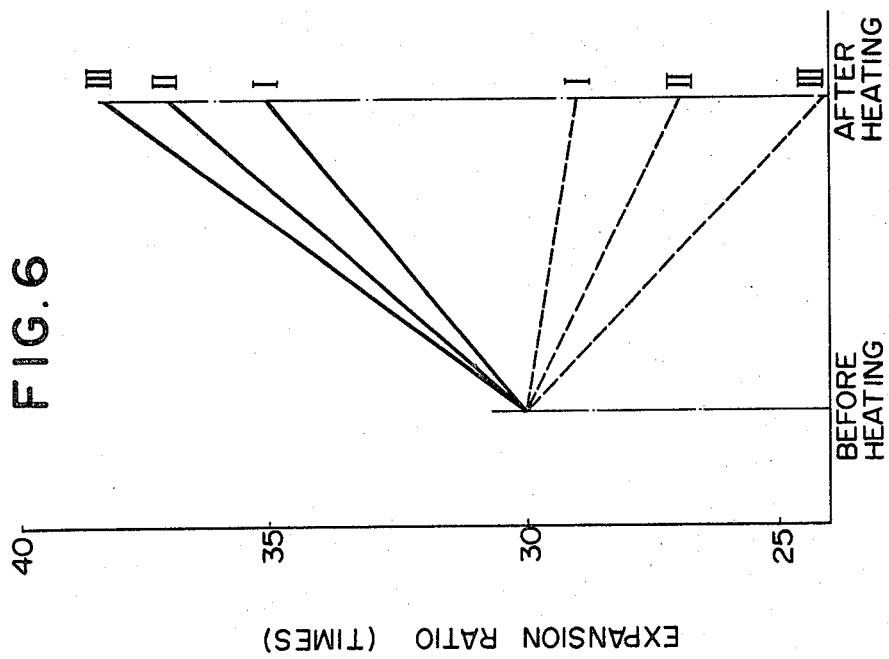
FIG. 6 is volume change when the particle is heated.

FIG. 6 shows changes in the volume when expanded cross-linked polyethylene particles (expansion ratio, 30 times) of which internal pressure of particle was substantially 0 kg/cm² (gauge presusre) were heated, indicating each heating condition by the expansion ratio of particles before and after heating, in which solid lines refer to expanded particles of the present invention and broken lines represent conventional ones. Symbols attached to solid and broken lines means the following heating conditions.

I. Steam pressure 0.4 kg/cm²G (110° C.) for 5 seconds

II. Steam pressure 0.6 kg/cm²G (113° C.) for 5 seconds

III. Steam pressure 0.8 kg/cm²G (117° C.) for 5 seconds (In all cases above, the particles were aged after heating for 5 hours at 70° C.)

As evident from FIG. 6, the conventional expanded particles were not given sufficient expandability simply by heating, whereas the expanded particles of the present invention gained self-expandability after heating process, that is, they were sufficiently expanded only by heating. This phenomenon is unimaginable from the conventional technical common sense, and it is an important factor to be distinguished from the conventional expanded particles.

The inventors of the present invention considered as follows, when applying expanded particles of this invention in molding production.

Assuming that expanded particles of nearly spherical shape are changed uniformly in a mold without compression, it is said that a gap space of not lower than 20% exits among the particles. Therefore, when an expandability of not lower than 1.3 times (or the ability of filling up a gap space of not lower than 30%) is imparted to the expanded particles of the present invention, the gap may be completely filled up, and a molded product with densely fused and welded particles may be obtained. It was accordingly assumed that a molded product of high quality might be theoretically obtained even if the foamability imparting process was omitted although it was an indispensable process in the conventional molding.

Also noticing that the expanded particles of the present invention provide a higher stiffness when pressurizing, as compared with the conventional expanded particles, probably owing to the existence of a thick outer skin stated earlier, the following analysis was attempted.

Figure 7:
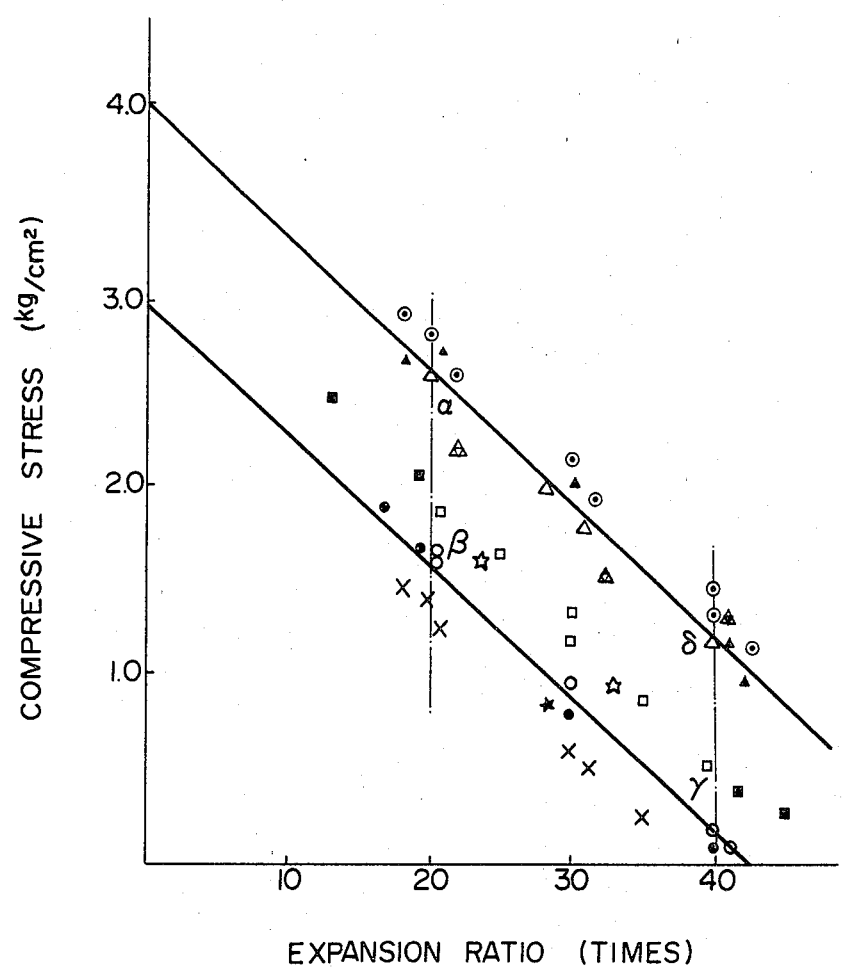
FIG. 7 is relationship between expansion ratio (B) and compressive stress (F) required to compress the expanded particle up to a compression ratio of 25%.

FIG. 7 is a graph representing the relation between expansion ratio (B) cm³/g [(B) means a reciprocal of an absolute density (g/cm³) of expanded particle] and compressive stress (F) required to compress the expanded particles by 25%, regarding cross-linked polyethylene expanded particles having various melting points.

Figure 26:
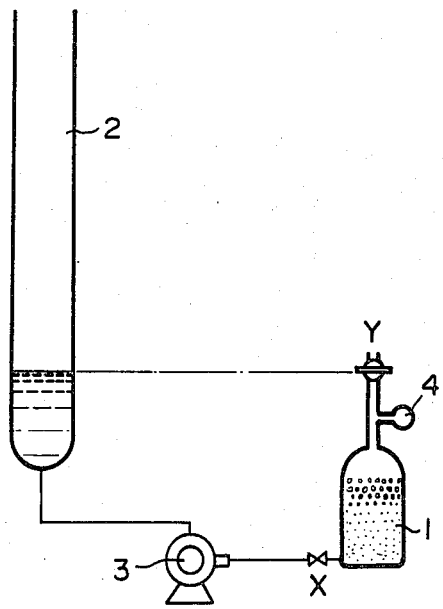
FIG. 26 is an apparatus diagram for measurement of compressive stress of particles.

The compressive stress (F) of particles was measured by using an apparatus shown in FIG. 26. In measurement, the particle to be measured is put in container 1, then valve Y is closed and valve X is opened, and water column vessel 2 is filled up with water. While gradually opening valve Y and holding down the beads, air bubbles in the container are removed, and the water level in the vessel is adjusted to the water level in the container. After shutting valve Y, pump 3 is driven until pressure gauge 4 reads a specified pressure. At this point, valve X is closed and pump is stopped. Thus, the compression ratio is calculated from the change in graduation indications of the water column vessel, and the stress is read on the pressure gauge.

The symbols in the diagram refer to the stratified results by the standard given in the table below.

| Melting point of the particle | Self-expandability of the particle (times) | Symbol |
|---|---|---|
| about 105° C. | not lower than 1.3 | ★ |
| | less than 1.3 | X |
| about 107° C. | not lower than 1.3 | ○ |
| | less than 1.3 | ◉ |
| about 110° C. | not lower than 1.3 | ☆ |
| | less than 1.3 | ★ |
| about 113° C. | not lower than 1.3 | □ |
| | less than 1.3 | ▣ |
| about 120° C. | not lower than 1.3 | △ |
| | less than 1.3 | ▲ |
| about 124° C. | not lower than 1.3 | △ |
| | less than 1.3 | ▲ |
| about 127° C. | not lower than 1.3 | ◎ |
| | less than 1.3 | ◉ |

The self-expandability of the particle refers to the extent of the expansion ratio as compared with the initial expansion ratio, when the particle is heated with 110° C. steam for 5 seconds and aged for 5 hours in a thermostatic oven controlled at 70° C. under the condition wherein the gas pressure in the particle is substantially 0 kg/cm² (gauge pressure) or the foaming agent content is substantially 0% by weight.

According to the results of stratification analysis in FIG. 7, in order to impart a self-expandability of not lower than 1.3 times to the expanded particle itself, the melting point of the expanded particle should be in the range of about 107° to 124° C.

Also, as shown from the distribution state of each particle shown in FIG. 7, even if the melting point of the expanded particle is insaid range, the relationship between the expansion ratio (B) and the compressive stress (F) must further satisfy the following equation:

$$\frac{1}{140}(566 - 10 \times B) \geq F \geq \frac{1}{140}(422 - 10 \times B)$$

(wherein B=20 to 40).

In other words, in other than that expanded particle has an expansion performance of not lower than 1.3 times of the original volume thereof when heated with steam at 110° C. for 5 seconds, the expanded particle should have a melting point in the range of about 107° to 124° C., and a point represented with coordinates (F, B) to show the relationship between expansion ratio (B) and compressive stress (F) should be in a domain of a quadrilateral formed by connecting four points =(2.61, 20), β(1.59, 20), γ(0.16, 40), and δ(1.19, 40) with straight lines, respectively. When it is considered that the melting point is a factor relating to the material characteristics to form the foam groups of the expanded particle, and that the relationship between said expansion ratio and compressive stress is a factor to show the state of foams which form the expanded particle and the thickness of outer skin, it can be said that the combination of these factors is a constitution index to show the constitution of foams of the expanded particle.

The expanded particle of the present invention having a self-expandability of not lower than 1.3 times as shown in FIG. 7 was found to offer a remarkable effect to compose an expansion molded product sufficiently withstanding actual use, without having to impart any expandability for expansion molding in a mold, exactly as initially assumed (see embodiment example 5).

This effect is very beneficial advantage for the industry that is intending to simplify the molding process of expanded cross-linked polyethylene particles.

Molded products, however, vary significantly in shapes, from a relatively simple shape being formed with nearly uniform and thin walls and a thick plate product of which wall thickness is not lower than 80 mm to a complicated shape consisting of a thin part of not higher than 10 mm and a thick part of not lower than 80 mm and an intricate constitution with the rising part of the wall extremely higher than the wall thickness. Such molded products having a complicated shape and a thick wall part are difficult to manufacture in high quality stability, since the distribution state of particles packed in a mold and transmission behavior of heating temperature are varied, as compared with single-plate structure of which wall thickness is about 20 to 50 mm.

According to the preliminary studies, even when expanded particles of this invention were used, utilization of the self-expandability thereof alone was insufficient to allow such varied molded products to achieve to the intended level of the present invention. Further attempts were hence made to re-evaluate the expanded particles from another viewpoint of the expansion function of the expanded particle exhibited when molded in a mold of higher difficulty by additionally imparting an expansion performance.

Figure 8:
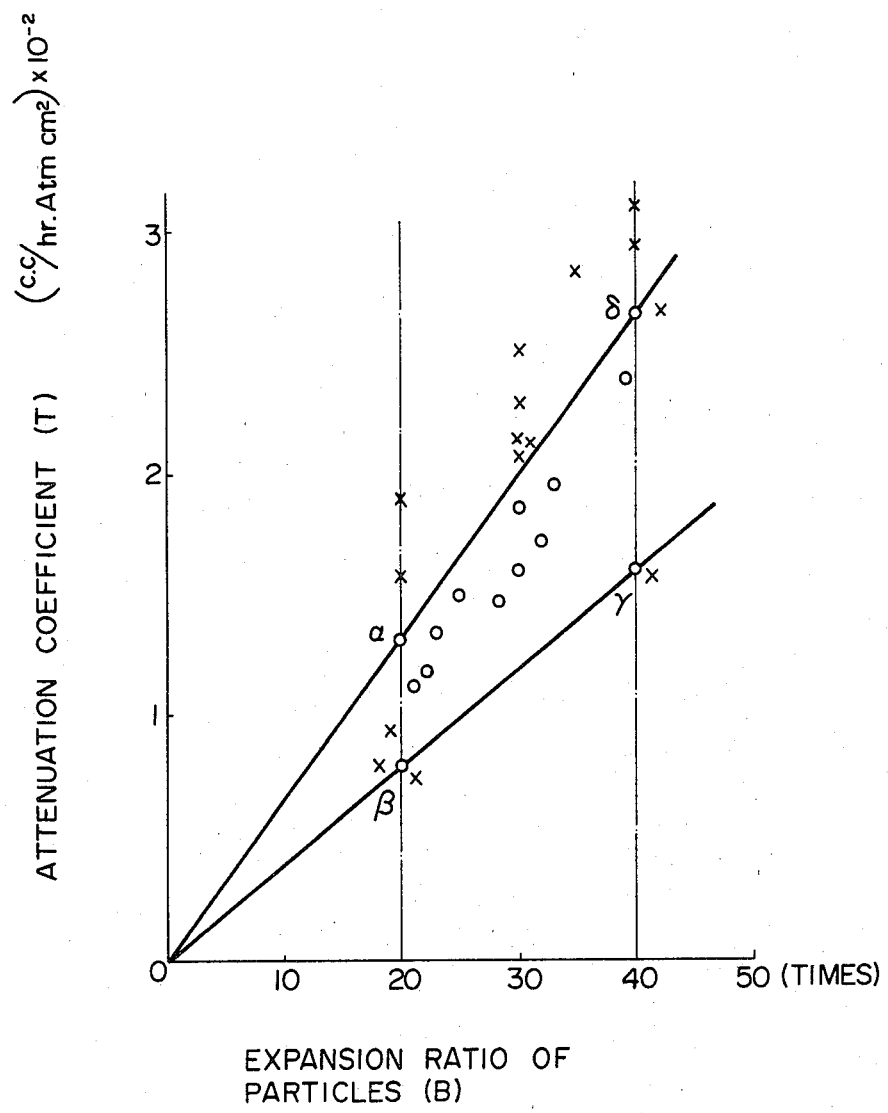
FIG. 8 is relation between expansion ratio (B) and attenuation coefficient (T) of air pressure which has been pressed into the particle.

FIG. 8 is a graph showing the relationship between expansion ratio (B) and attenuation coefficient (T) of the air pressure charged in the particle, in cross-linked polyethylene expanded particles having melting points ranging from about 107° C. to 124° C.

The attenuation coefficient of air pressure is determined as follows. Expanded particles are put in a pressure vessel and let stand under the conditions of 23° C. and 10 kg/cm² for 24 hours, and they are taken out and about 10 g thereof are quickly put separately into five containers. After accurately measuring the weight (Wi) of each sample, the containers are connected to five water column vessels, of which one end is open to the atmosphere, respectively, to measure the volume ($V_G$) of the gas which diffused from the expanded particles at certain time intervals, and the value related to each container, which is the inner gas pressure of expanded particle in each container, is obtained according to the following equation:

$$\text{Inner gas pressure of expanded particle} = \frac{V_G}{V_S - W_{i/d}} \quad \text{(unit: kg/cm}^2\text{)}$$

wherein d is the density of polyethylene used, and $V_S$ is the volume of the expanded particle calculated out of the weight of the expanded particle actually measured using the conversion factor of weight to volume obtained from a large amount of the sample taken out from the same population. The end point of the measurement in this case is the time when the difference of the inner gas pressures measured at two time points with an interval of one is less than 0.01 kg/cm². Now, supposing $P_1$ (atm) is the pressure at end point in the relationship between the inner gas pressure and the time which elapsed, $P_2$ (atm) the pressure after one hour having elapsed from the start of the measurement, $V_{G1}$ the volume of the gas which diffused within one hour since the start of the measurement, and n the number of particles put separately in each container, then the average of the value related to each container, which corresponds to the attenuation coefficient (T) of the air pressure, can be obtained according to the following equation:

$$T = \frac{2V_{G1}}{(6\sqrt{n} \ \sqrt{\pi} \ V_S)^{\frac{2}{3}}(2P_1 - P_2)} \quad \text{(unit: cc/hr atm cm}^2\text{)}$$

In the analytical evaluation in FIG. 8, expanded particles were given specified expansion property and molded into products of 80 mm wall thickness, and the expanded particles producing molded products satisfying the objective of the present invention were identified with o-mark, and those causing unsatisfactory molded products were denoted with x-mark, and these results were plotted in the relative diagram of the expansion ratio (B) of the particle and attenuation coefficient (T) of air pressure in the particle.

According to the results in FIG. 8, it was found that the expanded particles producing molded products satisfying the objective of the present invention must have such expansion ratio (B) and attenuation coefficient (T) of air pressure that suffice the relationship below:

$$B/1500 \geq T \geq B/2500$$

(wherein B=20 to 40).

That is, this range should be coordinates represented by a point (expansion ratio, attenuation coefficient of air pressure), which should be included in a domain of a quadrilateral formed by connecting four points $\alpha(20, 0.0133)$, $\beta(20, 0.0080)$, $\gamma(40, 0.0160)$, and $\gamma(40, 0.0267)$ with straight lines, respectively.

When the contents in Table 4 are incorporated in the results in FIG. 8, the results in FIG. 8 correctly require that, even when the melting point of the expanded particle is found within about 107° to 124° C., the stress (F) required to compress by 25% must satisfy, in the range of 20 to 40 times of the expansion ratio (B), the following relation:

$$\frac{1}{140}(566 - 10 \times B) \geq F \geq \frac{1}{140}(422 - 10 \times B);$$

and, moreover, that, if the smoothness (S) of expanded particle is not higher than 1.05, expansion ratio (B) and attenuation coefficient (T) of the air pressure should satisfy the relation:

$$B/1500 \geq T \geq B/2500$$

In short, the expanded particle satisfying all these conditions may be said to be the most preferable expanded particle relating to the present invention.

What is of note in the relationship between FIGS. 7 and 8 may be summarized into two points: one is that a majority of expanded particles included in the domain of a quadrilateral in FIG. 7 (namely, those of which self-expandability is not lower than 1.3 times) are enclosed within the domain of a quadrilateral in FIG. 8, whereas all expanded particles having self-expandability of not lower than 1.3 times are not made into molded products satisfying the objective of the present invention when evaluated in FIG. 8, and the second point is that the expanded particles of which self-expandability is less than 1.3 times cannot provide molded products satisfying the objective of the present invention even if a sufficient self-expandability was imparted.

Satisfactory explanation of this cause is difficult, especially in the field of molding wherein phenomena seldom proceed theoretically.

That is, when molding an expanded product in a mold, it is naturally preferable to increase the self-expandability exhibited in the mold, but the quality of product does not depend solely of the self-expandability but is rather related with other factors, such as heating method of particles in the mold and mode of expansion. Yet, self-expandability is also a difficult problem. Sufficiently effective self-expandability may not be obtained only by the conventional imparting means of self-expandability, such as addition of inner pressure of the particle and increase of particle compression ratio, which, on the contrary, may bring about unfavorable results, such as excessive fusion-welding of the surface and increase of density. Hence, if the conventional means is effective and safe when obtaining molded products of relatively simple shape, it will be difficult to obtain molded products of intricate shape having a good quality.

By contrast, in the strictly selected expanded particles of the present invention, since the particle itself has a sufficient self-expandability, impartation of additional self-expandability notably increases the expansion performance in the mold by complementary effects, which enables production of molded products of complicated shape having excellent quality not obtainable in the conventional method (see embodiment example 9).

In the viewpoint of obtaining expanded particles capable of producing molded products of much better quality, it is preferable to select particles of which melting point is about 110° to 120° C.

The following paragraphs refer to the method for producing the expanded particles of the present invention.

In the method for producing the expanded particles of the present invention, as the substrate resin is used polyethylene of which density (according to the density gradient control method of ASTM D1505) is 0.925 to 0.940 g/cm$^3$ and Vicat softening point (according to ASTM D1525) is 96° to 117° C.

As the polyethylene used as the substrate, a homopolymer of ethylene is preferable, but a copolymer of ethylene and other monomer may be used so far as the fundamental characteristics are not impaired, or a mixture of homopolymer of ethylene and other polymer may be used. This subtrate is first granulated to grain size of about 0.5 to 3 mm, and is then cross-linked by a known method, such as electron beam radiation method and organic peroxide impregnation method, to obtain cross-linked polyethylene particles, which are next foamed in single stage method or multistage method by using organic foaming agent or inorganic gas, or both, thereby producing expanded cross-linked polyethylene particles consisting of multiple fine cell constitutions.

The principal feature in the production of expanded particles of the present invention is the combination of total foam-selection of substrate resin and treatment of preferentially evaporating the foaming agent existing on the surface of polyethylene particles, when making expanded cross-linked polyethylene particles from cross-linked polyethylene particles by containing foaming agent and heating and foaming.

These production requirements are intended to form a thick outer skin, not less than three times of the substantial average cell membrane thickness of the inner cellular core, on the surface of the expanded particle, as shown in FIGS. 1 and 3; to present expanded particles having the melting point of about 107° to 124° C. necessary as the expanded particles of the present invention and satisfying the relationship equation of expansion ratio (B) and stress (F) required to compress by 25% as shown in FIG. 7; and to provide characteristics and constitution index, not found in the conventional expanded particles, such as satisfaction of relationship equation of expansion ration (B) and attenuation coefficient (T) of air pressure as shown in FIG. 8, smoothness (S) of not higher than 1.05, and intense surface gloss. In this case, the melting point of the expanded particle does not necessarily coincide with that of substrate resin. Since, the melting point varies, for instance, with the method of cross-linking and cross-linking gel ratio, it is desired to predetermine the conditions so that the intended melting point of the expanded particle may be finally obtained. Generally, the cross-linking gel ratio should be preferable in the range of 50 to 80% by the gel ratio (xylene insoluble portion).

The treatment of preferentially evaporating the foaming agent on the particle surface after containing the foaming agent in the particles may be given in various methods, such as the process of exposing the foamable particles containing the foaming agent to the atmosphere in open state for about 5 to 10 minutes or contacting with inert gas, the process of reducing the pressure suddenly until the pressure in the system is reduced to the atmospheric pressure or lower in the stage of transferring said foamable particles into the foaming container, and the process of transferring said foamable particles directly into the foaming container and blowing a heating gas below the foaming start temperature into the container to raise the temperature of the particles. Meanwhile, the duration of about 5 to 10 minutes of exposing to the atmosphere in the above process may be shortened to about 1 to 5 minutes when other means is applied simultaneously. These methods, however, cannot produce an intended outer skin thickness if the preferential diffusion of the foaming agent is insufficient. On the contrary, under the condition of excessive preferential diffusion of the foaming agent, the foaming agent contained in the particles may be also evaporated, and the intended outer skin may not be formed, or still worse, the expanded particles of the intended expansion ratio may not be obtained. Therefore, it is essential to predetermine the optimum conditions depending on the foaming agent to be used and the evaporation means to be applied.

These conditions may be easily selected by the manufacturers so long as the intended expanded particles are clarified in the present invention.

To obtain expanded particles of high expansion ratio, it is desirable to increase the expansion ratio gradually to the target ratio, by repeating the operation of first making foamable particles into expanded particles of expansion ratio of not higher than 10 times, and containing inorganic gas in the obtained expanded particles, and heating and foaming them.

This gradual process is intended to form a more homogeneous, breakfree, thick outer skin on the surface of the expanded particles when the final expanded particles are produced by foaming without applying immoderate stress to the outer skin of the particles generated by preferentially evaporating in the initial stage of making foamable particles into the expanded particles.

The molded product by the present invention is described below.

Figure 9:
FIGS. 9 and 10 show cross sectional photographs of the membrane layer part formed by fusing and welding the expanded particles in each of the present molded products and of the conventional one, respectively.
Figure 10:
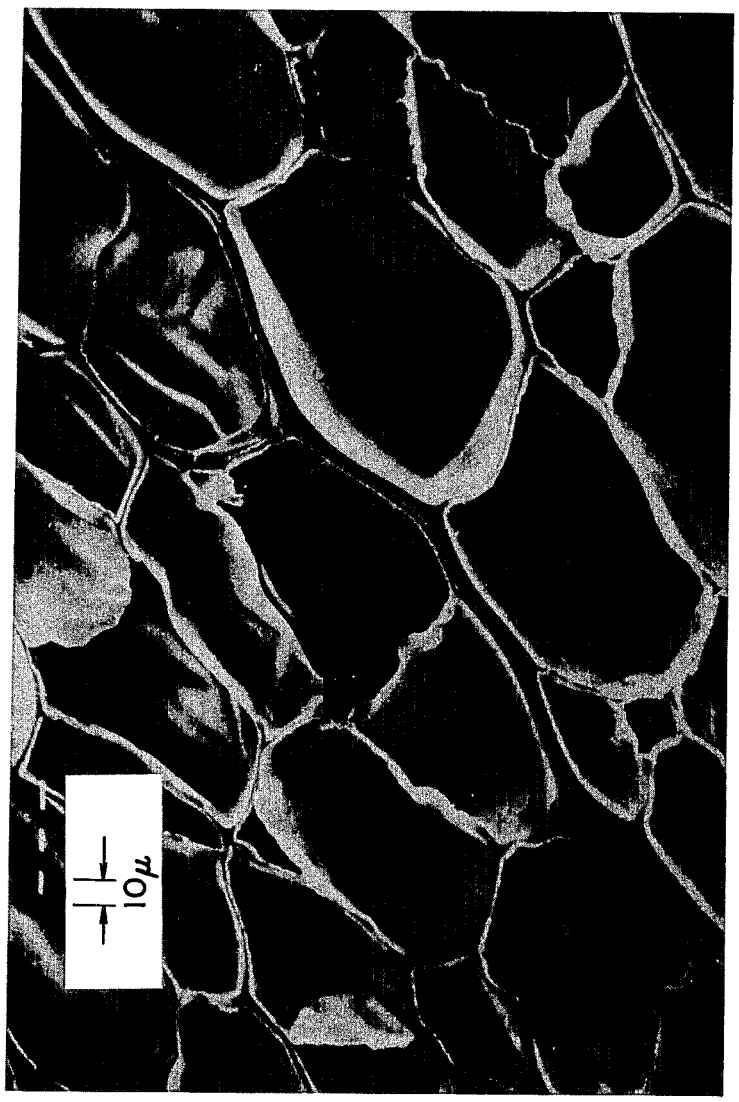

FIG. 9 and 10 are enlarged photographs magnified ×450) of cross-sections of the inside of the molded products by the present invention and conventional method, respectively, particularly showing the membrane part formed by fusion-welding of the expanded particles.

Comparison of FIGS. 9 and 10 clearly distinguishes the molded product by the present invention, which is a molded product formed to a specified shape, with a multiplicity of expanded cross-linked polyethylene particles having a thick outer skin being fused and welded closely to the outer skin of adjoining particles, resulting in the substantial average thickness of interfacial membrane formed by thermally fusing and welding of particles much more than three times of the substantial average thickness of the cell membranes in the particle.

Since the molded product by this invention has a multiplicity of membranes as shown in FIG. 9 existing in the inside thereof, it is expected that the product may relatively excel in the stiffness as these membranes are supposed to work as ribs.

Considering this point, the inventors of the present invention attempted to evaluate the characteristics required as a molded product in stratification analysis, on multiple molded products fabricated for estimation of the expanded particles of the present invention shown in FIG. 8. (See Table 4).

Figure 11:
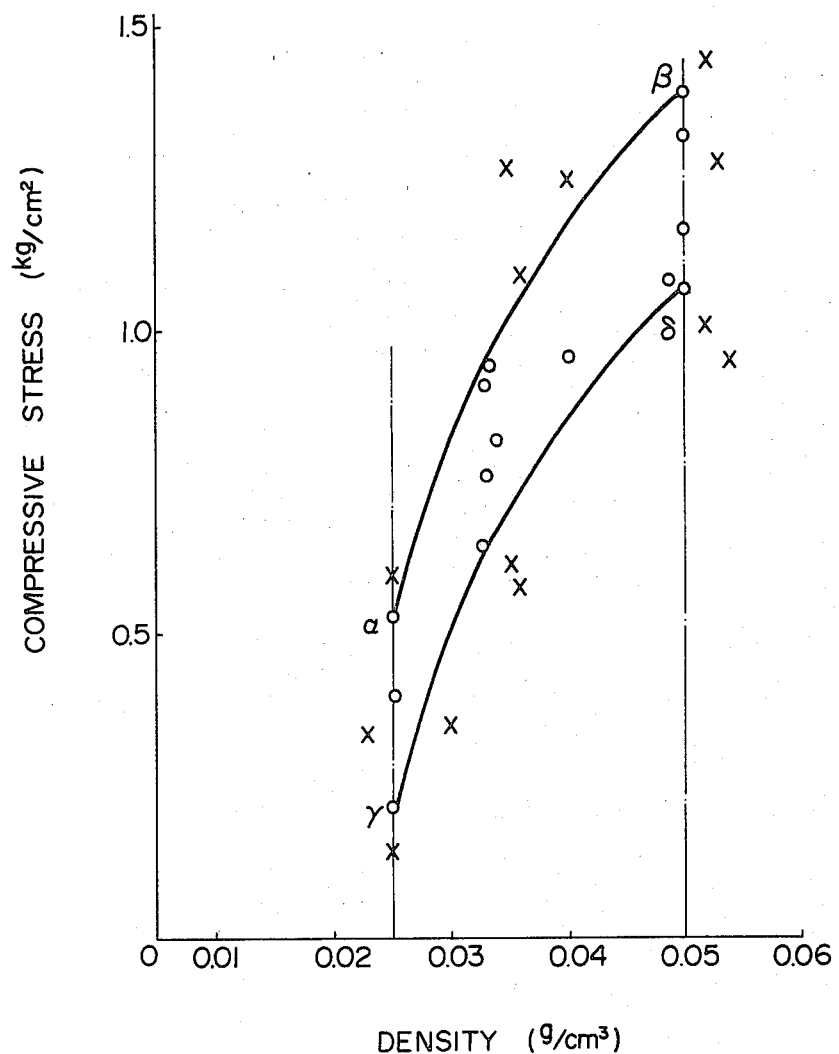
FIG. 11 is relation between density (D) of the expansion-molded product and stress (R) required to compress the molded product up to a compression ratio of 25%.

FIG. 11 shows the relationship between the compressive stress (R) required to compress by 25% and the density (D) of the molded product of expanded molded products having melting points at about 107° to 124° C.

FIG. 11 is a graph estimating the quality of molded products by the water absorption ratio which represents the junction and thermal fusion-welding state of the particles in a molded product. In the graph, the standard of water absorption ratio was taken at 0.3 vol.%, and those lower than the standard were identified by o-mark and higher, by x-mark. This 0.3 vol.% standard was selected in relation to the persistence of thermal insulation property.

According to FIG. 11, in order to obtain a molded product of which water absorption ratio is at least not higher than 0.3 vol.%, the density (D) should be within the range of 0.025 to 0.05 g/cm$^3$, and the relation thereof with the compressive stress (R) (in the unit of kg/cm$^2$) to compress the molded body by 25% should satisfy the formula below:

$$\frac{1}{140}\left(270 - \frac{6}{D}\right) \leq R \leq \frac{1}{140}\left(315 - \frac{6}{D}\right)$$

This is an indispensable condition to keep the water absorption ratio not higher than 0.3 vol.%, which suggests that the molded product is neither dense nor low in water absorption ratio if failing to coincide with the standard above.

That is, even when a molded product has a melting point between about 107° and 124° C., it should be one wherein a point represented with coordinates (D, R) to show the relationship between the density of said molded product (D) and the compressive stress (R) should be in a domain of a sector surrounded by the lines connecting points $\alpha(0.025, 0.54)$, $\beta(0.050, 1.39)$, $\gamma(0.025, 0.21)$, and $\delta(0.050, 1.07)$.

This compressive stress (R) was determined by measuring the compressive stress when a strain of 25% was caused, by compressing a specimen measuring 100 mm by 100 mm by thickness of not smaller than 25 mm at a rate of 12+3 mm/minute.

When it is considered that said melting point is relevant to the material to constitute fine cells and that (R) and (D) are relevant to the shape and dimensions of fine cells, cell membrane thickness and foam structure including the distribution thereof as well as to the comprehensive estimation of the fusion-welding state of particles, and moreover that these factors ultimately govern the mechanical characteristics such as cushioning property, it can be said that the combination of the melting point of the resin and the relationship between compressive stress (R) and density (D) of the molded product is an index to show the inner structure of the molded product.

In addition, from the viewpoint of presenting molded products of good quality, the melting point of the molded product should be selected from the range of about 110° to 120° C., according to the results shown in Table 4.

The melting point of the molded product stated here nearly coincides with that of the expanded particles used for the production thereof, but does not necessarily agree with the melting point of the substrate used when manufacturing the expanded particles.

All melting points were determined by means of a differential heat thermometer (Differential Scanning Calorimeter, Type 1-B, manufactured by Perkin-Elmer Inc.) under the conditions of a temperature raising rate of 10° C./minute and a sample amount of 0.005 g.

Meanwhile, the inventors of the present invention noticed that the molded products of which water absorption ratio was 0.3 vol.% as stratified in FIG. 11 were divided into very dense ones and loose ones having certain cavities, depending on the contact state of expanded particles constituting the surface of products. Then, this point was analyzed.

Figure 12:
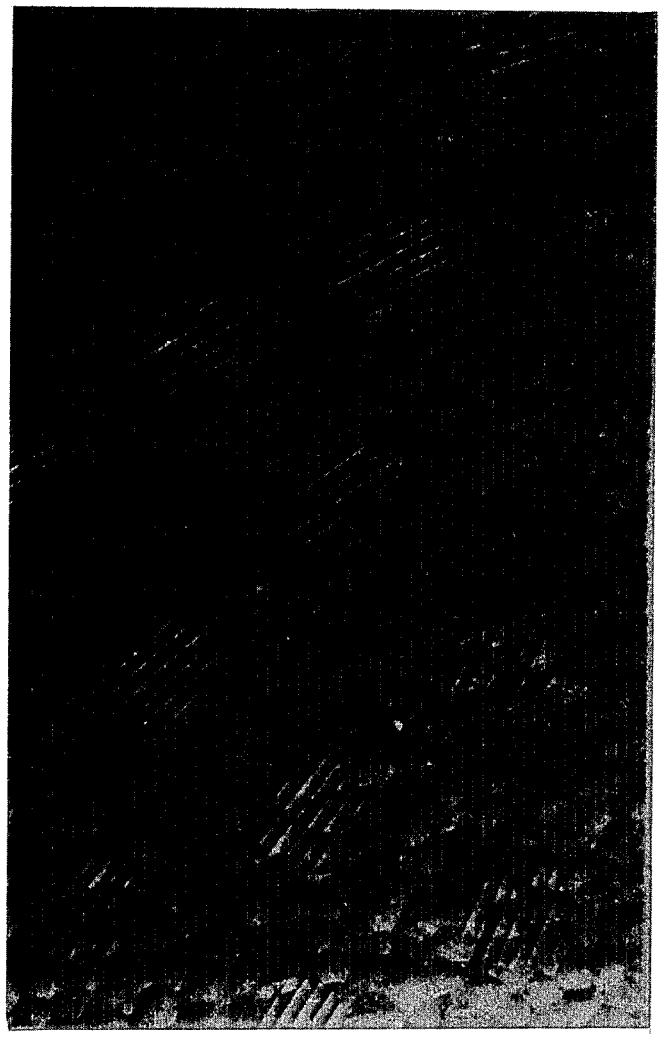
FIGS. 12 and 13 are magnified photographs of the surface of molded product wherein expanded particles exist densely and that of molded product having a few cavities, respectively.
Figure 13:
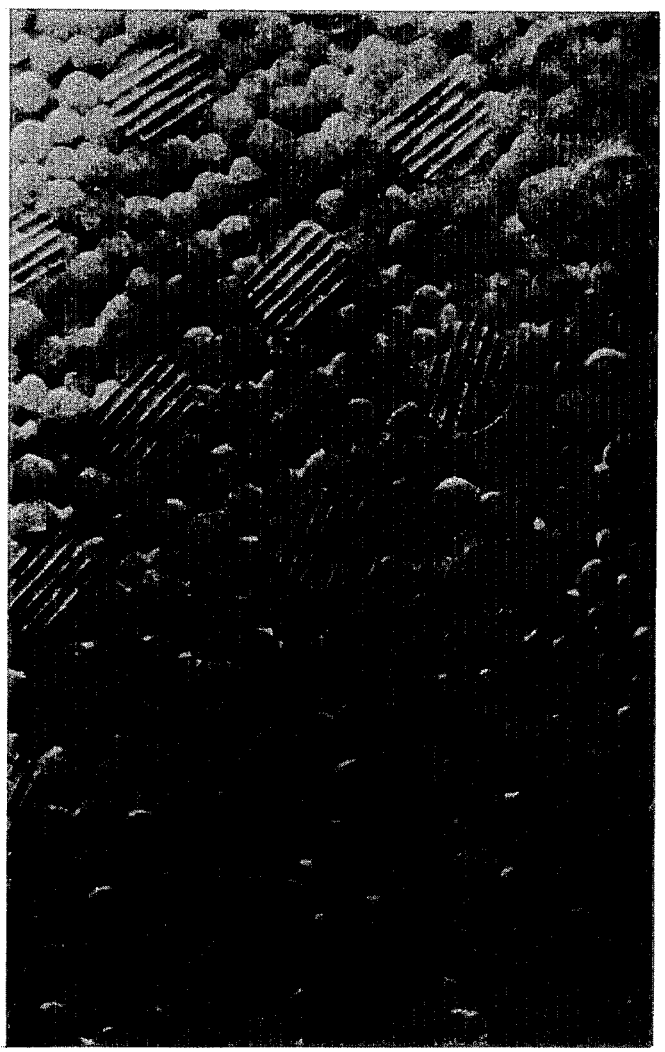

FIG. 12 shows an enlarged photograph (magnified ×1.8) of a molded product of which expanded particles on the surface are very densely packed (division number 69), and FIG. 13 shows a similar photograph of a product having a slight cavity (division number 57).

It was hence attempted to evaluate the difference in the surface state of molded products by the factor of cavity coefficient.

This cavity coefficient is expressed by the number of cavities (a notch having a width of not lower than 1 mm is regarded as a cavity) seized by the ridge part of the cutting lines, which are several ruled lines being drawn for a total length of 1 meter on the surface of a molded product in a specified unit area (10 cm × 10 cm) avoiding the steam orifice.

Figure 16:
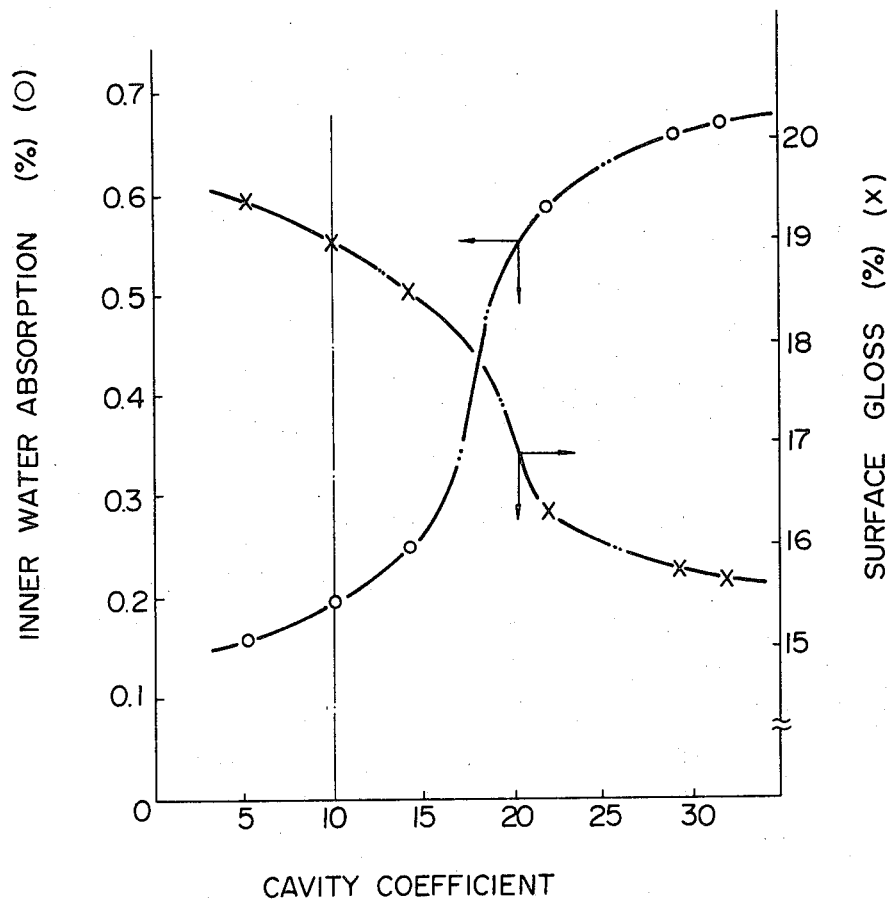
FIG. 16 is relation between cavity coefficient and surface gloss or inner water absorption ratio of molded product.

FIG. 16 is a diagram to show the relationship between thus obtain cavity coefficient and the surface gloss and inner water absorption ratio of the molded product.

The larger the cavity coefficient, the diagram indicates, the lower becomes the surface gloss and the higher the inner water absorption ratio. This means that even when a molded product is manufactured by using an expanded particle excelling in surface gloss, the surface gloss is spoiled, if many cavities exist in the surface, due to shades and irregular reflection of light thereof, thereby decreasing the degree of gloss of the molded product surface, and that the multiplicity of cavities in the surface results in lack of expansion of particles, at least, locally, and insufficiency of particle junction and fusion-welding, thereby increasing the water absorption ratio of the molded product inside.

Since this cavity coefficient is a factor to represent the surface state of a molded product qualitatively, a slight different thereof within a range of plus or minus 1 does not cause substantial change. Nevertheless, the cavity coefficient of commercial polyethylene expanded molded products is not generally lower than 20, while that of the molded product having a strong gloss is in the range of 4 to 6. As it is evident from this fact, the limit of cavity coefficient is clearly distinguished from the commercial products is about 10. This limit can be sufficiently acknowledged by comparing the surface state of the conventional product and the molded product of the present invention.

Figure 14:
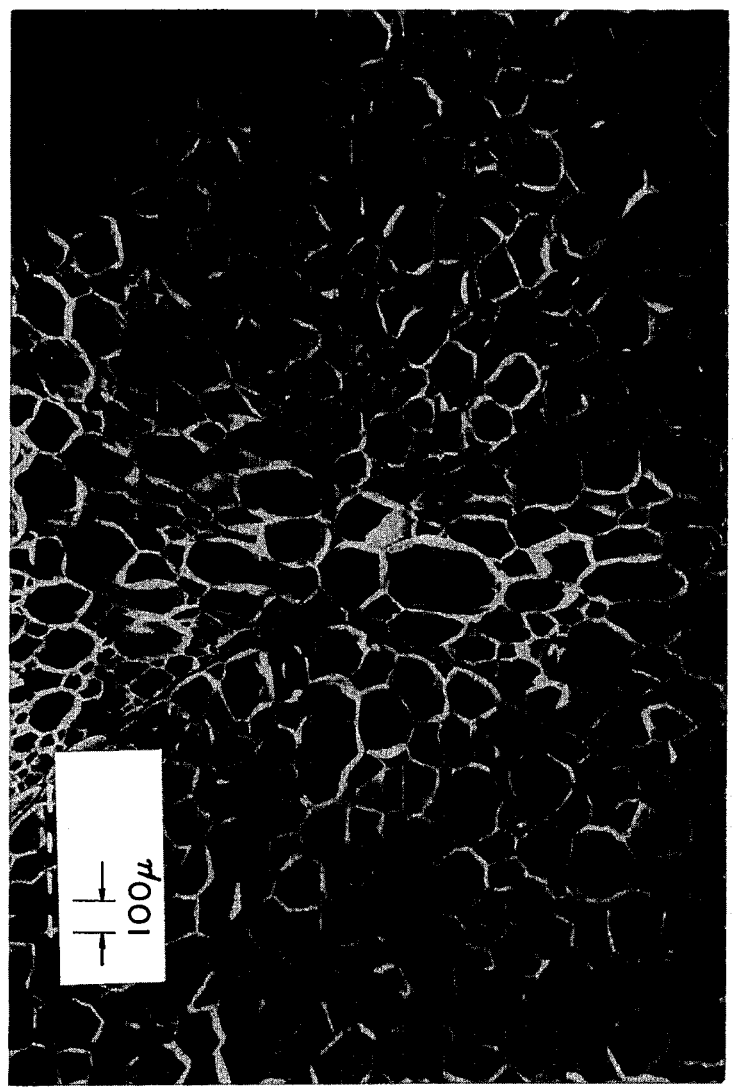
FIGS. 14 and 15 are magnified cross sectional photographs of the inner core parts of the molded products corresponding to FIGS. 12 and 13, respectively.
Figure 15:
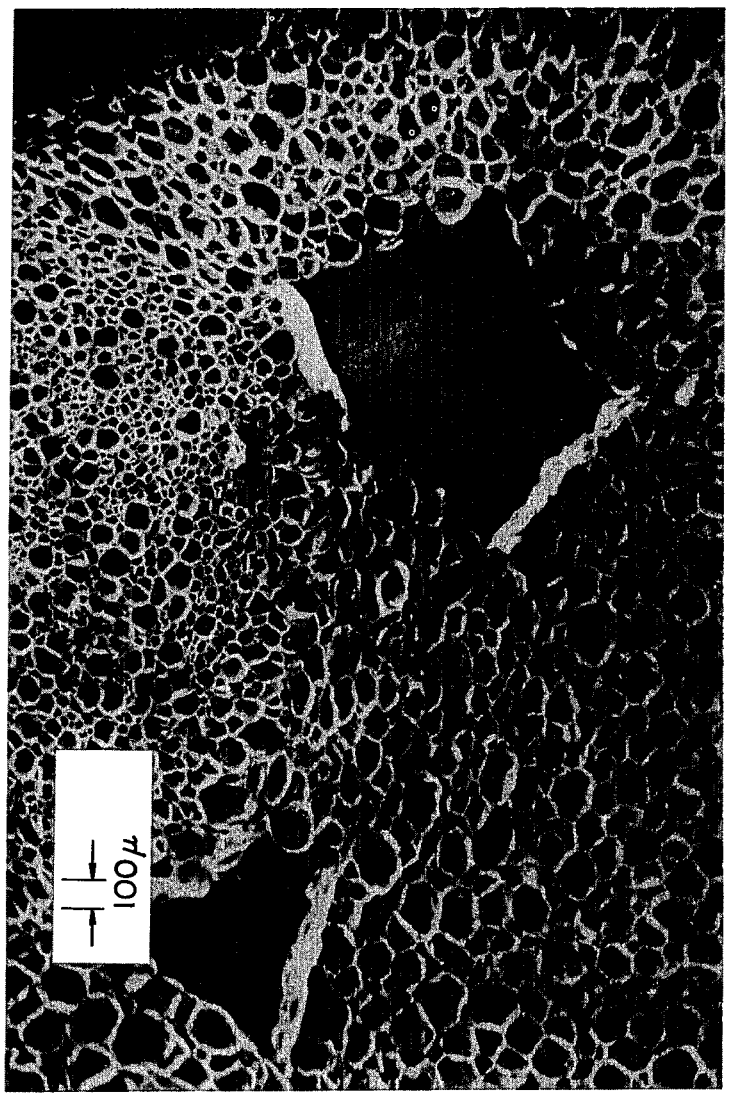

FIGS. 14 and 15 are magnified views of cross-section of the central parts of molded products corresponding to FIGS. 12 and 13, respectively. In FIG. 15, the particle bonding state in the inner cross-section is rough, whereas the molded products of the present invention (FIG. 14) shows a sufficiently homogenized state of fusion-welding of particles in the inner cross-section. This fact agrees well with the results of the inner water absorption ratio shown in FIG. 16.

Figure 19:
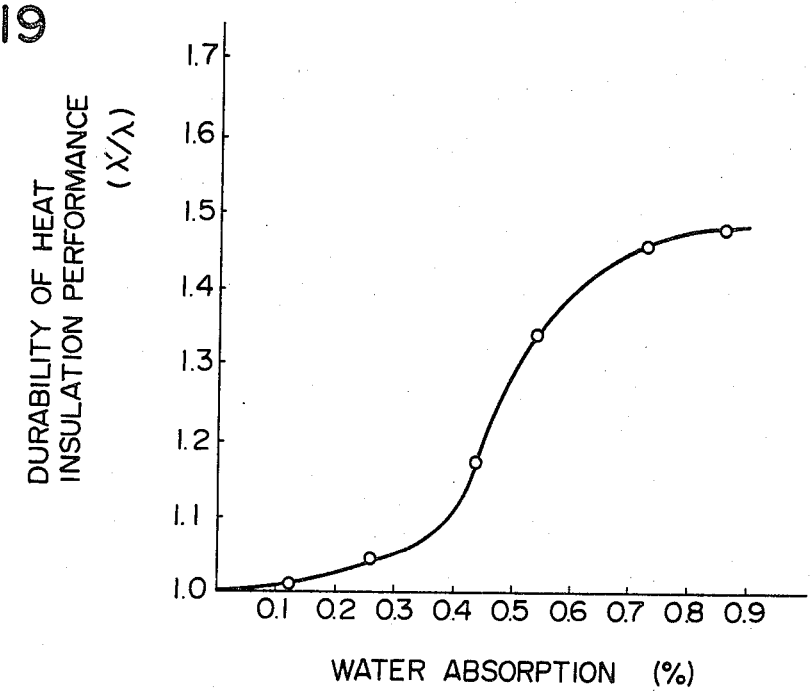
FIG. 19 is relation between water absorption property of expanded molded product and durability of thermal insulation property thereof ($\lambda'/\lambda$).
Figure 27:
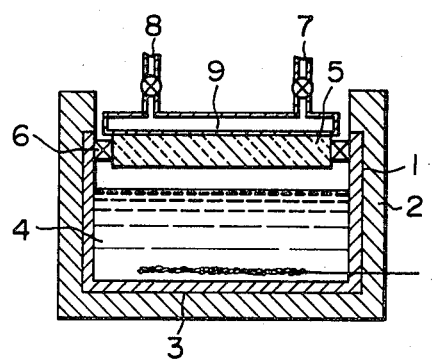
FIG. 27 is a cross section of apparatus for measurement of durability of thermal insulation property.

FIG. 19 shows the relationship between the water absorption ratio possessed by the expanded molded product and the persistence ($\lambda'/\lambda$) of the thermal insulating property thereof with the passage of time. This is the result of acceleration test by the apparatus shown in FIG. 27. This acceleration test corresponds to about 2 years in the rooftop thermal insulating time.

As obvious from FIG. 19, as far as the persistence of thermal insulating property with the passage of time is concerned, the 0.3 vol.% of water absorption ratio involves an important technical significance.

Figure 20:
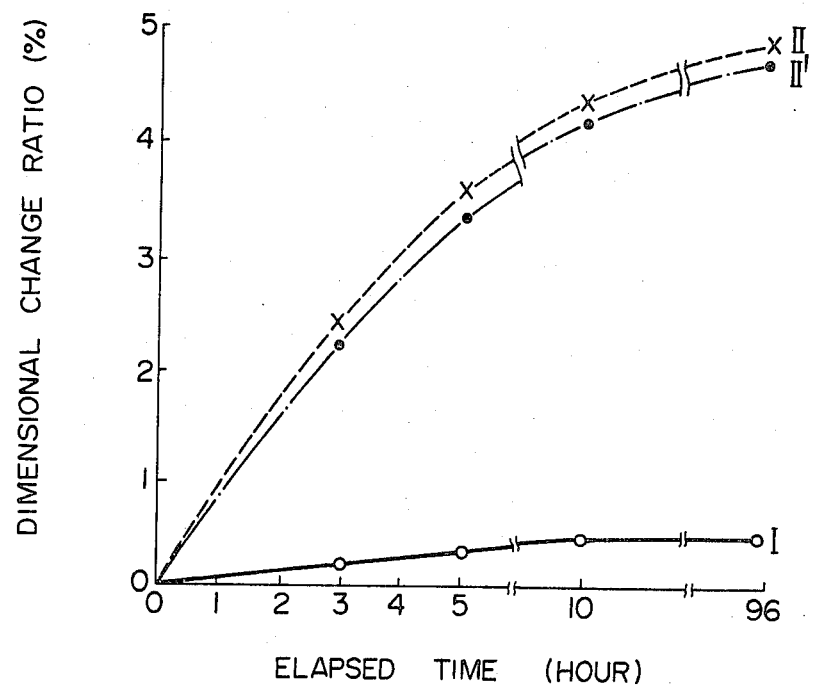
FIG. 20 is a graph showing dimensional change ratio vs. time in heated state of molded product.
Figure 22:
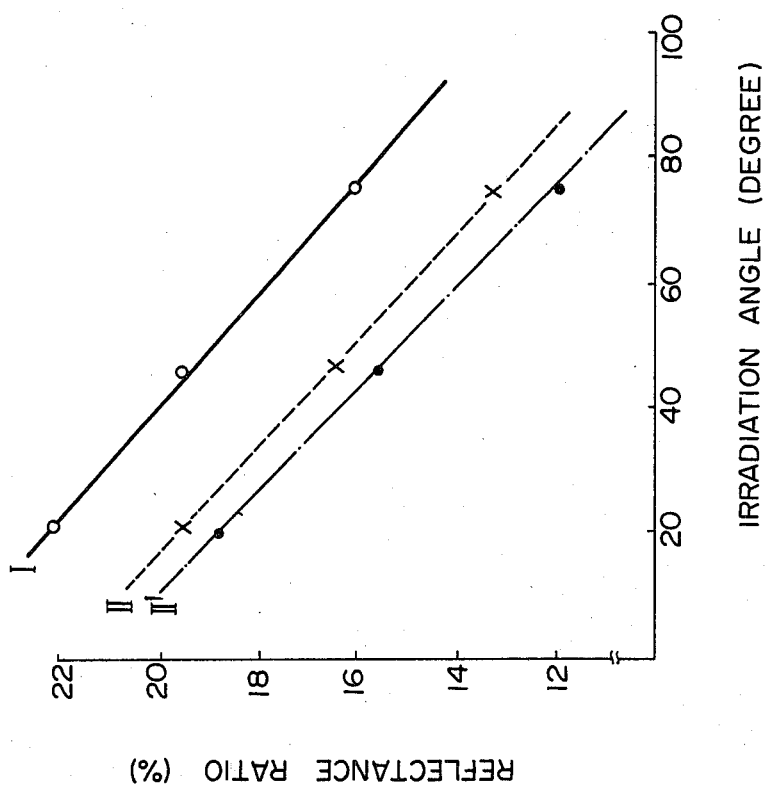
FIG. 22 is a graph showing surface gloss (reflection ratio) of molded product.
Figure 21:
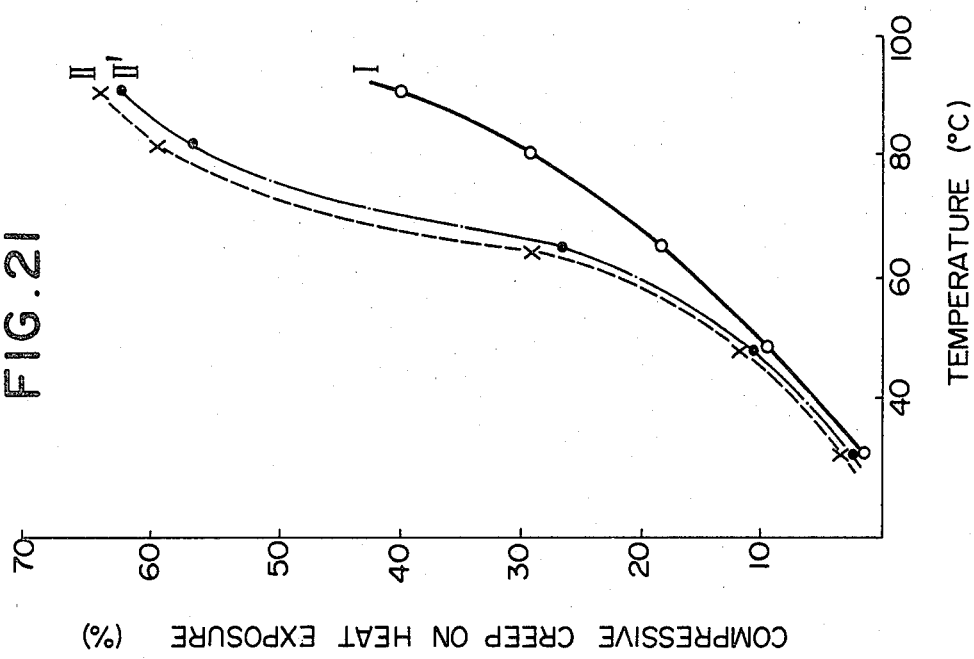
FIG. 21 is a graph showing change ratio of compressive creep in heated state of molded product.
Figure 23:
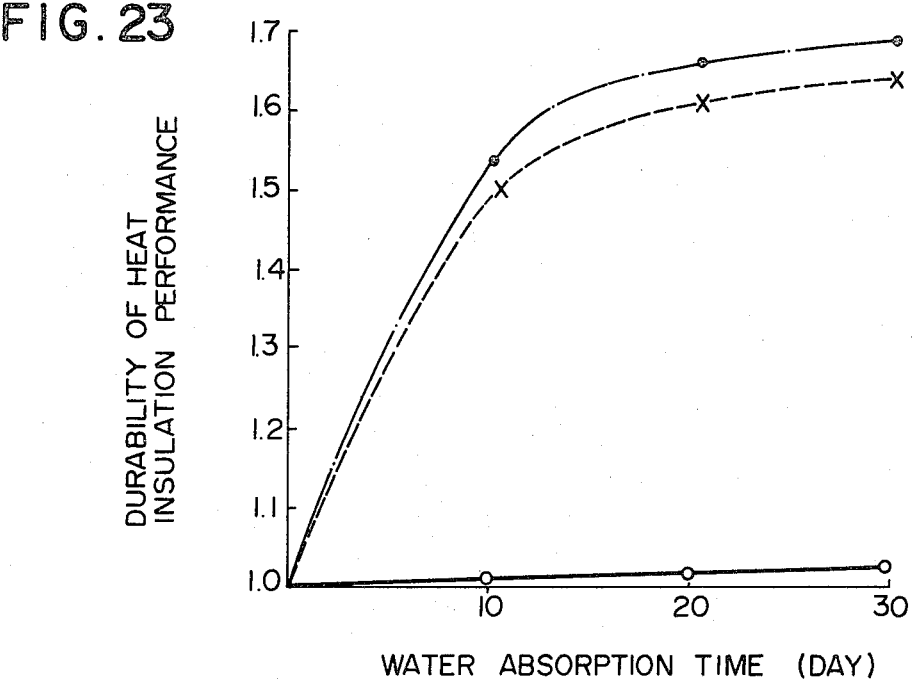
FIG. 23 is a graph of relation between water absorption time and durability of thermal insulation property.
Figure 24:
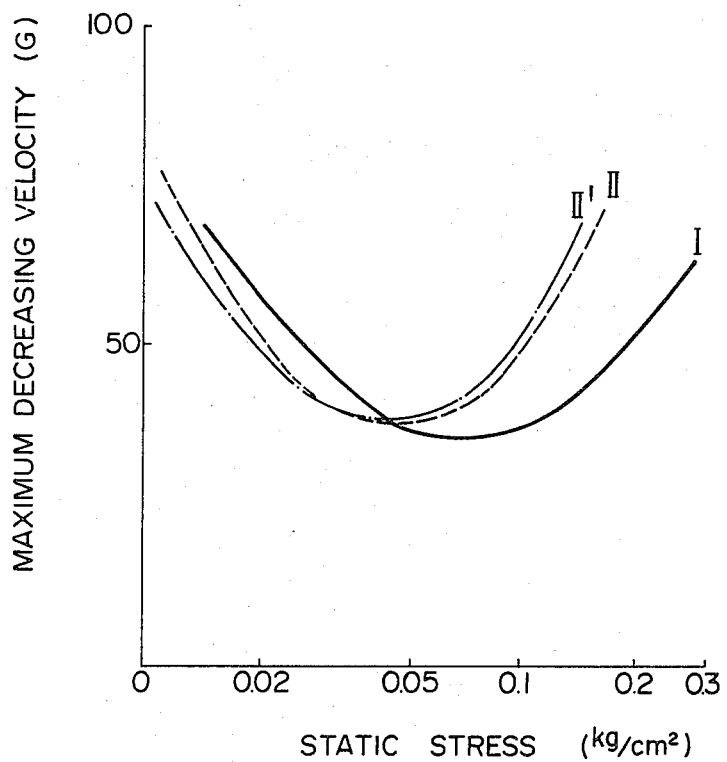
FIG. 24 is a graph of cushioning property of molded product.

The molded product of the present invention (indicated by solid line I) and two kinds of commercial products (broken line II, and dash-dot line II') are compared with respect to dimensional changes in thermal history in FIG. 20, thermal-resistant compressive creep in FIG. 21, surface gloss in FIG. 22, persistence of thermal insulating property in FIG. 23, and cushioning property in FIG. 24. These diagrams unanimously prove that the molded product of the present invention possesses notably excellent characteristics as compared with the conventional ones.

All these characteristics are close to the practical properties required on the market for various fields of applications, and the molded product of the present invention possesses all of them at a superior degree as compared with the conventional products. It may be hence said that the molded product of the present invention is both novel and full of practicality.

The production method of a molded product in the present invention is as follows.

Polyethylene particles of which density is 0.925 to 0.940 g/cm$^3$ and Vicat softening point is 96° to 117° C. are cross-linked, and a foaming agent is impregnated in the particles, and this foaming agent on the particle surface is preferably evaporated, then the particles are wholly expanded to produce expanded cross-linked polyethylene particles.

Thus obtained expanded particles are packed in a mold and heated, and these expanded particles are expanded, thermally fused and welded to form a molded product, which is then aged to obtain an expanded cross-linked polyethylene molded product.

In other words, spherical expanded particles made of cross-linked polyethylene of which expansion ratio (B) is 20 to 40 times, which are expanded cross-linked polyethylene particles having a substantially thick outer skin of which substantial average thickness is not lower than 3 times the substantial average cell membrane thickness of the inner cellular core thereof, namely, expanded cross-linked polyethylene particles of which stress (F) required to compress by 25% and expansion ratio of particles (B) is in the range of 20 to 40 times, satisfying the relation of $$\frac{1}{140}(566 - 10 \times B) \geq (F) \geq \frac{1}{140}(422 - 10 \times B)$$

are charged in a mold and heated, and said particles are expanded, thermally fused and welded to form a molded product, which is then aged to obtain a molded product.

The most important effect in this production of molded products is that the expanded particles to be used in molding own a self-expandability of not lower than 1.3 times, which means a molded product may be obtained without newly imparting an expansion ability.

Nevertheless, to obtain a molded product of difficult shape and dimensions requiring high molding technology, proper expanded particles are selected, wherein the melting point should be within about 107° to 124° C. and the stress (F) required to compressed by 25% should be in the range of 20 to 40 times of the expansion ratio (B), satisfying the relation of $$\frac{1}{140}(566 - 10 \times B) \geq F \geq \frac{1}{140}(422 - 10 \times B)$$

and, moreover, the smoothness (S) should not be higher than 1.05 and the attenuation coefficient of air pressure (T) should be in said range of expansion ratio (B), also satisfying the relation of $$B/1500 \geq T \geq B/2500$$

after selecting such expanded particles, an expandability is newly imparted to said expanded particles, and the expanded particles are heated in a mold before the new expandability disappears, and a molded product is produced, then the obtained molded product is finally aged.

This combination effect not only enables production of complicated structure not obtainable in the conventional molding method, but also helps provide various new performances not found in the conventional molded products, such as persistence of thermal insulating property, thermal resistant compressive creep, dimensional stability in thermal history, and smoothness and gloss of the surface.

Impartation of expansion property means, preferably, to charge inorganic gas (such as air) into the expanded particles until the inner gas pressure becomes 0.05 to 3 kg/cm$^2$ (gauge pressure), or to compress the expanded particles with gas until the bulk volume becomes 95 to 50% of the original bulk volume and use this expansion force when molding in a mold.

The reason is, the expansion property is not sufficient when the inner gas pressure is less than 0.05 kg/cm$^2$ (or the compression is smaller than 95% by volume), and inadequate expanded particles are observed on the surface and inner core of the molded product; or if the inner gas pressure exceeds 3 kg/cm² (or the compression beyond 50%), the thermal fusing and welding in the inner of the molded product is not carried out completely.

The aptitude range of said expandability is slightly deviated from the conventional range, and it is assumed that the imparted expandability produces a characteristic expansion phenomenon in the mold in complementary effect with the self-expandability of the expanded particles.

Figure 25:
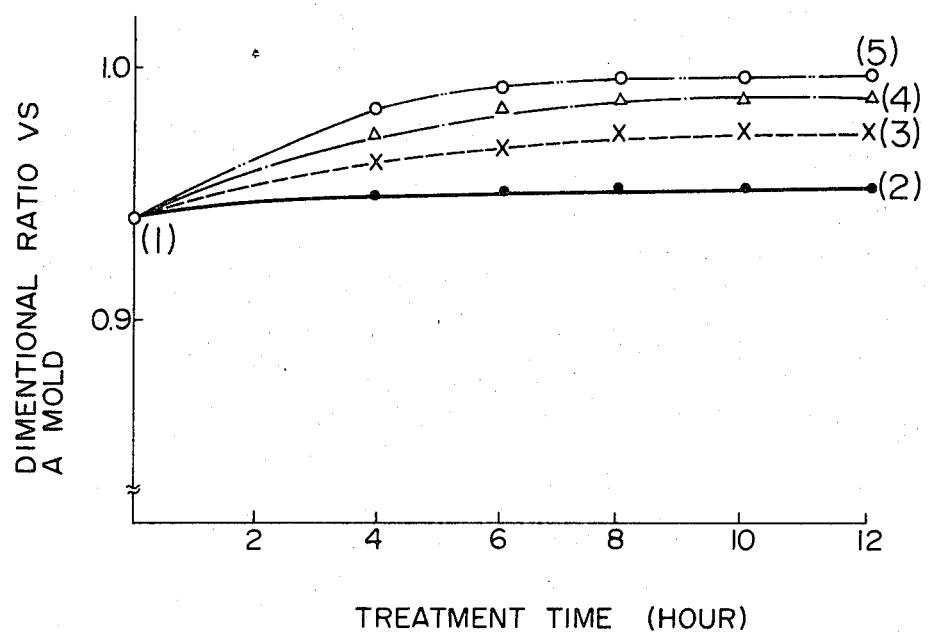
FIG. 25 is a graph of aging treatment effect by the present method.

FIG. 25 illustrates the effect of aging.

The "aging" referred to in this invention is intended to adjust the mold dimensional ratio (the ratio of inner dimensions of the mold to the dimensions of the final molded product) as closely to 1 as possible. This is a new effect produced by combination of the properties of the expanded particles used in the present invention and the aging conditions.

The mold dimensional ratio is, in the conventional molding method, about 0.93 to 0.90 (a shrinking portion of about 7 to 10%), and the mold was previously designed in a larger size in consideration of this shrinking portion but the mold did not shrink uniformly depending on the shape and structure of the mold inside, so that the designing and manufacturing of molds were extremely difficult. In this invention, by contrast, since the mold dimensional ratio may be adjusted closely to 1, actually not lower than 0.95, the mold can be designed quite easily, and molds of intricate shapes can be fabricated with ease.

It is known in FIG. 25 that the effective aging condition in the present invention is heat treatment at not lower than 60° C. for not shorter than 6 hours, preferably, at 80° C. for not shorter than 8 hours.

The following discussions relate to considerations on the reasons why the production method of molded products of the present invention using expanded particles of this invention could produce such novel molded products. That is;

The expanded particle is constituting a relatively thick outer skin of smooth surface. This outer skin, for the sake of the smoothness thereof, has a intense gloss, and possesses high stiffness and thermal resistant stability, together with a high melting point, and is low in permeability of gas. Accordingly, when charging such particles into a mold, they are charged uniformly in a mold up to every corner thanks to the smoothness of the particles.

Heating in the mold is generally direct heating by steam which has a large calorific value. In the case of molded products of thick wall or complicated shape, however, since the pressure loss of steam to heat the inside by passing through is large, higher steam pressure is necessary in order to heat all particles sufficiently in the inside and every corner of the mold. But such high steam pressure setting often causes melting and fluidizing of the particles on the mold face side, which may block the passage of the steam to impede interior heating. In the case of the particles of the present invention, on the other hand, since the thermal stability is high, high vapor pressure may be safely used, and the particles may be heated instantly and uniformly, deep in the inside of the mold.

Next, the expanded particles receiving heat will be expanded by the thermal expansion of the gas contained in the inside and restoration of bent molecular chains. At this time, since the gas retention of the particles and magnitude of elasticity will allow the intrinsic expansion performance to act directly as the expansion of the particles, tight fusion-welding of particles filling up all gaps of particles may be obtained.

In the cooling stage, each expanded particle is reduced in pressure and is subjected to a corresponding external pressure. At this time, the stiffness of the cell membrane substrate and that of the thick membrane formed by thermal fusion and welding of the outer skins of particles will support this external pressure and cause an action to admit the atmosphere into the inside, so that a perfect molded product free from distortion and shrinkage may be obtained.

Thus, when such favorable conditions as mentioned above were combined and overlapped together, it is estimated, a molded product of notably high practicality not experienced in the conventional ones was successfully completed.

The present invention is to be described in further details by referring to examples of embodiments, wherein the resins A to G specified below were used.

| Resin | Product | Manufacturer | Density (g/cm³) | Vicat softng. pt. (°C.) |
|---|---|---|---|---|
| A | F-2130 | Asahi-Dow Ltd. | 0.921 | 91 |
| B | A trial product | " | 0.925 | 96 |
| C | A trial product | " | 0.925 | 104 |
| D | Q-0951 | " | 0.930 | 105 |
| E | A trial product | " | 0.935 | 112 |
| F | A Santec trial prod. | Asahi Chemical Industry Co. | 0.940 | 117 |
| G | A Santec trial prod. | Asah: Chemical industry Co. | 0.942 | 119 |

Determination and evaluation of each characteristic property is performed as follows:

(1) Thermal Fusion Welding Property of the Expanded Beads

A foamed plate specimen of 300 mm length, 300 mm width and 80 mm thickness provided with a cut split of 30 mm depth is torn off while imparting a bending thereto. The per cent proportion of the number of broken up beads to the total number of beads existing on the torn off surface is determined and the evaluation therefor is made on the basis given in the following Table.

| Measure of Evaluation | Denotation Mark | Note |
|---|---|---|
| 95% or more | O | Beads are completely fused together |
| not lower than 70% and less than 95% | Δ | Cracking occurs along the interface between the beads, when the torn off surface is bent outside down. |
| Less than 70% | x | Beads will be removed, when the torn off surface is rubbed intensely by finger tip. |

(2) Water Absorption Ratio

Preparing a specimen having dimensions of about 300 mm length, about 300 mm width and about 80 mm thickness, the volume (V) and the weight (W) thereof are determined accurately. Then, the specimen is kept immersed in fresh water of about 20° C. in a sub-aqueous position of 25 mm below the water surface for 24 hours. Thereafter, it is taken out and the outer surfaces thereof are wiped, whereupon the weight increase ($\Delta W$) thereof is determined. The water absorption ratio in volume percent is calculated according to the following equation:

$$\text{Water Absorption Ratio} = \frac{\Delta W \times 100}{V \times (\text{density of water})}$$

The evaluation therefor is based on the following scheme:

| Measure of Evaluation | Denotation Mark | Note |
|---|---|---|
| Less than 0.3% | ○ | Degradation in the ability of thermal insulation in out-door use is relieved (required marketing quality). |
| Not lower than 0.3% and less than 0.5% | Δ | Degradation in the ability of thermal insulation in out-door use is considerable (a quality to be aimed at hitherto). |
| Not lower than 0.5% | x | Almost no thermal insulation is recognizable (conventional quality). |

(3) Sinking

On the upper face of a foamed specimen having a form of plank with dimensions of about 300 mm length, about 300 mm width and about 80 mm thickness, a horizontal scale is placed diagonally. The maximum height of the gap appearing between the scale and the upper face of the specimen is measured and percent proportion of this maximum gap to the diagonal length is calculated. The evaluation therefor is made on the following basis:

| Measure of Evaluation | Denotation Mark | Note |
|---|---|---|
| Less than 0.5% | ○ | Better (a quality to be aimed at hitherto) |
| Not lower than 0.5% and less than 2% | Δ | Ordinary (conventional quality) |
| Not lower than 2% | x | Worse (not marketable) |

(4) Dimensional Change Ratio on Heat

A foamed specimen cut into 50 mm cube is placed in a thermostatic bath adjusted at 90° C. for 96 hours and is then taken out and cooled on standing for 1 hour. Dimensional change ratio in percent, based on the original dimension, is determined and the evaluation thereof is made on the basis of the following scheme:

| Measure of Evaluation | Denotation Mark | Note |
|---|---|---|
| Less than 2% | ○ | Better (required marketing quality) |
| Not lower than 2% and less than 4% | Δ | Ordinary (corresponding to the quality to be aimed at hitherto) |
| Not lower than 4% | x | Worse (conventional quality) |

(5) Compressive Creep Property

A foamed specimen cut into a rectangular parallelopiped of 50 mm×50 mm×25 mm is pressed by a load of 0.1 Kg/cm² at 25° C. The thickness of the specimen directly thereafter ($t_0$) and the thickness after 24 hours ($t$) are determined, from which the compressive creep property in percent is calculated according to the following equation:

$$\text{Compressive Creep Property (\%)} = \frac{t_0 - t}{t_0} \times 100$$

Evaluation thereof is based on the following scheme:

| Measure of Evaluation | Denotation Mark | Note |
|---|---|---|
| Less than 1% | ○ | Better (required marketing quality) |
| Not lower than 1% and less than 3% | Δ | Ordinary (a quality to be aimed at hitherto) |
| Not lower than 3% | x | Worse (conventional quality) |

(6) Thermal Resistant Compressive Creep Property

Procedures as in the previous item of Compressive Creep Property is followed at a temperature of 80° C. to determine a compressive creep. The evaluation therefor is made on the basis of the following scheme:

| Measure of Evaluation | Denotation Mark | Note |
|---|---|---|
| Less than 35% | ○ | Better (a quality to be aimed at hitherto) |
| Not lower than 35% and Less than 55% | Δ | Ordinary (conventional quality) |
| Not lower than 55% | x | Worse (not marketable) |

(7) Gloss (Reflectivity) of Molded Product

A molded product is mounted on a gloss meter model VG-10 of the firm Nippon Denshoku Kogyo so as to adjust the angle of incidence of illumination to be 45° to determine the reflectivity of the illuminated surface of the molded product. The evaluation therefor is based on the following scheme:

| Measure of Evaluation | Denotation Mark | Note |
|---|---|---|
| Not lower than 19% | ○ | Better (a value to be aimed at hitherto) |
| Not lower than 16% and less than 19% | Δ | Ordinary (conventional quality) |
| Less than 16% | x | Worse (not suited for use for glossy applications) |

(8) Durability of Thermal Insulation Property

Using a specimen cut out from the central portion of a molded product into a slab of 200 mm length, 200 mm width and 25 mm thickness, the measurement is carried out using an apparatus shown in FIG. 10.

Thus, a vessel 1 surrounded by an insulating material 2 and furnished with a thermoregulator 3 is filled with warm water 4 of 50° C. and the opening of the vessel is blocked up by the specimen mentioned above under the interposition of a gasket 6. Here, the specimen is disposed, that a distance of about 30 mm will remain between the lower face of the specimen and the water surface. The upper face of the specimen fits closely to a cooling panel 9 cooled at 3° C. by cooling water recirculated from a circulation water inlets 7 and 8. The specimen is kept in this condition for 30 days. The specimen is then taken out and is wiped over its surfaces with gauze, before it is subject to a determination of its thermal conductivity $\lambda'$ according to ASTM C 518. This value is compared with the original thermal conductivity $\lambda$ measured preliminarily under the same condition before the test, to obtain the rate of variation $\lambda'/\lambda$, in order to carry out the evaluation thereof in accordance with the following scheme:

| Measure of Evaluation | Denotation Mark | Note |
|---|---|---|
| Less than 1.05 | ○ | Better (required marketing quality) |
| Not lower than 1.05 and less than 1.40 | △ | Ordinary (conventional quality) |
| Not lower than 1.40 | x | Worse (not marketable) |

(9) Integral Appraisal

The evaluations of each characteristic property are integrated to appraise the total marketing value. The appraisal is expressed by the classification marks given in below.

| Mark | Classification |
|---|---|
| ⊚ | Required marketing quality |
| ○ | A quality to be aimed at hitherto |
| △ | Conventional quality |
| x | Not Marketable |

EXAMPLE 1

(a) In a pressure vessel, 2 parts by weight of magnesium carbonate, 0.5 part by weight of dicumyl peroxide (cross linking agent) were finely dispersed into 180 parts by weight of water. Thereto was added the resin D in an amount of 100 parts by weight (average particle size 1.2 mm). After carrying out gas replacement of the vessel with nitrogen gas, a heating treatment was conducted first at 100° C. for two hours and then at 135° C. for 7 hours, to obtain cross-linked granular polyethylene having gel ratio (xylene-insoluble fraction) of about 60%.

The so obtained cross-linked granular polyethylene was placed in a pressure vessel and thereto was placed in a pressure vessel and thereto was added a liquid of dichlorodifluoromethane (foaming agent). The vessel contents were then heated at 90° C. to subject to an impregnation treatment for two hours to obtain expandable cross-linked polyethylene beads containing about 14% by weight of the foaming agent.

The so prepared expandable beads were then exposed once to the atmospheric air for 8 minutes and were charged into a foaming apparatus to expand by heating with a steam of 0.7 Kg/cm$^2$ gauge. The expanding was carried out at a condition of a temperature elevation time of 10 seconds and subsequent heating time of 5 seconds. The expansion ratio of the so obtained beads (primary expanded beads) was about 6 times.

The primary expanded beads were then further treated in a compressed air of 5 Kg/cm$^2$ at 80° C. for 24 hours to prepare expandable beads containing air as foaming agent. The so treated beads were expanded by heating with a steam of 0.7 Kg/cm$^2$ gauge at a condition of temperature elevation time of 35 seconds and heating time after the temperature elevation of 5 seconds. The expansion magnification of the so expanded beads (secondary expanded beads) was about 17 times.

The secondary expanded beads were still further subjected to the same air impregnation expanding treatment as above. Expanded cross-linked polyethylene beads having an expansion ratio of about 30 times were obtained (Beads No. 1).

(b) In a pressure vessel, there were charged 180 parts by weight of water containing 0.25 part by weight of potassium phosphate prepared from an aqueous solution of sodium phosphate and an aqueous solution of potassium chloride. Thereto was added under agitation an aqueous mixture, which was prepared by admixing 0.38 part by weight of dicumyl peroxide to 20 parts by weight of water containing 0.1 part by weight of Neoperex with heating to attain fine dispersion thereof. Thereto were further added 100 parts by weight of a low density granular polyethylene having a particle size of 2.5 mm (manufactured by the firm Mitsui Polychemical under the trade name of Milathon-9). After a gas replacement of the vessel with nitrogen, the vessel contents were subjected to a treatment of first at 100° C. for 2 hours and then at 135° C. for 7 hours. Cross-linked polyethylene beads having a xylene-insoluble gel ratio of about 50% was obtained. This cross-linked polyethylene beads were charged in a pressure vessel to attain an impregnation with dichlorodifluoromethane in an amount of 12% to prepare heat expandable beads. The beads were then retained under a gaseous atmosphere of dichlorodifluoromethane at a pressure of 18 Kg/cm$^2$. After the pressure had been relieved, expanded beads having an apparent specific volume of about 45 ml/g and an expansion ratio of about 31 times were obtained (Beads No. 2).

(c) In a pressure vessel, 60 parts by weight of Sumikathene (trade name) G 202 Pellet (a low density granular polyethylene of the firm Sumitomo Chemical Co.) having a particle size of 2-6 mm were dispersed under agitation into 300 parts by weight of water containing dissolved 0.6 part by weight of polyvinylalcohol GH-23 (a polyvinylalcohol of the firm Nippon Synthetic Chemical Ind. Co.). Separately, 0.6 part by weight of dicumyl peroxide was dissolved into 6 parts by weight of xylene to prepare a solution of cross-linking agent and this solution was added to the above dispersion. Thereto were further added 18 parts by weight of butane (foaming agent) and the vessel was pressurized by introducing nitrogen gas up to 5 Kg/cm$^2$, whereupon the reaction was conducted at a temperature of 125°-130° C. for 10 hours. Cross-linking ratio of the so obtained expandable beads was 43% as the gel ratio (fraction insoluble in xylene).

By heating the expandable beads, which have been separated from the dispersed system after cooling and which have a particle size of 3–6 mm, with steam to 100° C., expanded beads of cross-linked polyethylene exhibiting an expansion ratio of 25 ml/g (corresponding to an expansion ratio of about 25 times) were obtained (Beads No. 3).

Comparing the above three lots of beads Nos. 1 to 3, it was confirmed, that Beads No. 1 exhibit a high gloss, whereas beads in the lots Nos. 2 and 3 show almost no gloss. Microscopic observation of the bead inner structure for each lot of beads shows that bead of No. 1 has a relatively thick membraneous layer over the surface thereof, whereas beads of Nos. 2 and 3 have no such layer.

Enlarged photographs of complete section of typical bead in the lots Nos. 1 and 2 are recited in FIGS. 1 and 2 each in a magnification of 23 times. And further enlarged cross sectional photographs of surface layer of the particles are given in FIGS. 3 and 4 each in a magnification of 250 times respectively corresponding to FIGS. 1 and 2.

The gloss of beads recognized may be attributed to the particularly formed membraneous surface layer covering the inner cellular structure opalized by expanding the semitransparent raw material resin, and therefore, is completely different from the raw material resin in the feeling.

The three lots of beads were further examined for their expandability by heating them under the conditions of 110° C. for 5 seconds, 113° C. for 5 seconds and 117° C. for 5 seconds, respectively. The results are shown in FIG. 6 and in Table 1.

TABLE 1

| Lot Not | Gloss | Skin Layer | Self-Expandability (heating at 110° C.) |
|---|---|---|---|
| 1 | high | thick | 1.34 |
| 2 | low | thin | 1.06 |
| 3 | low | thin | 1.17 |

It can be seen from Table 1, that the beads produced according to the procedures of (a) exhibit a singularity as compared with those produced according to the procedures of (b) and (c) which may find general application, as the beads of (a) have thick skin layer and show high gloss and greater self-expandability of not lower than 1.3 times.

EXAMPLE 2

The procedures of Example 1-(a) were repeated, except that the expandable beads before converting into the primary expanded beads were exposed to the atmospheric air either for 2, 5 or 10 minutes and the temperature elevation time is settled to 10 seconds in all the expansion steps.

The thereby obtained three kinds of beads denoted by Lot Nos. 4, 5 and 6 were examined for their surface smoothnesses (S). The estimated values are given in Table 2 together with those of the beads of Lot Nos. 1 and 2 of Example 1 under simultaneous representation of the visual estimations of surface gloss for them.

As shown in Table 2, the order of gloss value from the point of view of the total scores coinsides with the trend towards the smaller smoothness (S). Nobody has estimated the beads having smoothness value below 1.05 by a score of two points or less.

Thus, while the surface smoothness (S) is based on a mere visual observation of the surface structure within a microscopic spectacle range, it is to be understood, that this value represents briefly the requirements for an expanded bead which is considered to high a gloss.

TABLE 2

| Division number | Smoothness (S) | Estimated point | | | | | Total | Order |
|---|---|---|---|---|---|---|---|---|
| | | I | II | III | IV | V | | |
| 2 | 1.091 | 1 | 2 | 1 | 1 | 1 | 6 | 5 |
| 4 | 1.072 | 1 | 2 | 2 | 1 | 2 | 8 | 4 |
| 5 | 1.050 | 3 | 4 | 3 | 3 | 3 | 16 | 3 |
| 1 | 1.026 | 3 | 4 | 4 | 3 | 4 | 18 | 2 |
| 6 | 1.013 | 4 | 4 | 4 | 4 | 4 | 20 | 1 |

(Note)
Division numbers correspond to those given in examples of embodiment.

EXAMPLE 3

Using the resins B, C, D, E and F, expandable beads of cross linked polyethylene were prepared according to the procedures of Example 1-(a). The expandable beads so obtained were then exposed to the atmospheric air for a period from zero to 10 minutes, before they were charged into an expanding apparatus. The beads were then heated with a steam of 0.5–1.0 Kg/cm² gauge under a condition of temperature elevation period of about 10 seconds and subsequent heating period of 5 seconds to obtain primary expanded beads.

The primary expanded beads so obtained were treated in a compressed air of 10 Kg/cm² at 80° C. for 6 hours to convert into air-containing expandable beads, which were then heated with a steam of 0.5–1.0 Kg/cm² gauge under a condition of temperature elevation period of about 10 seconds and subsequent heating period of about 5 seconds to obtain secondary expanded beads.

By repeating the above treatment of air impregnation and expansion, expanded beads of cross linked polyethylene exhibiting an expansion ratio of 15–45 were obtained (Lot Nos. 7 to 54).

The so obtained expanded beads were then left in the atmospheric air for one week and, after it had been confirmed, that the internal pressure of the beads correspond to zero Kg/cm² gauge, they were subjected to compression. The compressive stress at a compression of 25% of the volume of beads was recorded.

In order to estimate the self-expandability, the expanded beads mentioned previously were heated with steam at 110° C. for 5 seconds and were then stored in a thermostatic bath at 70° C. for 5 hours. The expandability was determined by dividing the expansion ratio of the so treated beads by the expansion ratio of the original expanded beads.

Results were summarized in Table 3.

TABLE 3

| Lot No. | Melting Point (°C.) | Expansion Ratio | Compressive Stress at 25% Compression (Kg/cm²) | Self-Expandability |
|---|---|---|---|---|
| 7 | 105.1 | 18 | 1.45 | 1.20 |
| 8 | 105.0 | 20 | 1.38 | 1.12 |
| 9 | 105.1 | 21 | 1.23 | 1.26 |
| 10 | 105.2 | 30 | 0.58 | 1.11 |
| 11 | 105.1 | 31 | 0.48 | 0.93 |
| 12 | 105.1 | 35 | 0.25 | 1.26 |
| 13 | 107.2 | 17 | 1.88 | 1.08 |
| 14 | 107.3 | 19 | 1.66 | 1.17 |

TABLE 3-continued

| Lot No. | Melting Point (°C.) | Expansion Ratio | Compressive Stress at 25% Compression (Kg/cm²) | Self-Expandability |
|---|---|---|---|---|
| 15 | 107.2 | 20 | 1.59 | 1.31 |
| 16 | 107.1 | 20 | 1.64 | 1.32 |
| 17 | 107.1 | 30 | 0.79 | 1.19 |
| 18 | 107.2 | 30 | 0.96 | 1.30 |
| 19 | 107.0 | 40 | 0.10 | 1.30 |
| 20 | 107.1 | 40 | 0.16 | 1.23 |
| 21 | 107.1 | 41 | 0.09 | 1.28 |
| 22 | 110.3 | 23 | 1.61 | 1.33 |
| 23 | 110.0 | 28 | 0.84 | 1.18 |
| 24 | 110.1 | 33 | 0.94 | 1.34 |
| 25 | 113.2 | 13 | 2.45 | 1.00 |
| 26 | 113.1 | 19 | 2.03 | 1.25 |
| 27 | 113.2 | 21 | 1.83 | 1.32 |
| 28 | 113.1 | 25 | 1.62 | 1.33 |
| 29 | 113.0 | 30 | 1.32 | 1.37 |
| 30 | 112.9 | 30 | 1.18 | 1.35 |
| 31 | 112.9 | 35 | 0.85 | 1.35 |
| 32 | 113.1 | 39 | 0.53 | 1.32 |
| 33 | 113.0 | 42 | 0.40 | 1.20 |
| 34 | 113.2 | 45 | 0.26 | 0.56 |
| 35 | 120.1 | 22 | 2.19 | 1.33 |
| 36 | 119.9 | 32 | 1.52 | 1.31 |
| 37 | 120.2 | 41 | 1.29 | 1.25 |
| 38 | 124.0 | 18 | 2.65 | 1.27 |
| 39 | 123.9 | 20 | 2.61 | 1.30 |
| 40 | 124.0 | 21 | 2.70 | 1.18 |
| 41 | 123.9 | 28 | 1.98 | 1.31 |
| 42 | 123.8 | 30 | 2.00 | 1.25 |
| 43 | 123.8 | 31 | 1.73 | 1.32 |
| 44 | 123.8 | 40 | 1.19 | 1.30 |
| 45 | 124.0 | 41 | 1.16 | 1.24 |
| 46 | 123.7 | 42 | 0.98 | 1.17 |
| 47 | 127.1 | 18 | 2.91 | 1.14 |
| 48 | 127.3 | 20 | 2.80 | 1.23 |
| 49 | 127.3 | 22 | 2.58 | 1.12 |
| 50 | 127.4 | 32 | 2.12 | 1.26 |
| 51 | 127.2 | 30 | 1.92 | 1.05 |
| 52 | 127.2 | 40 | 1.44 | 1.26 |
| 53 | 127.1 | 40 | 1.30 | 1.03 |
| 54 | 127.2 | 43 | 1.15 | 0.96 |

From Table 3, it can be seen, that expanded cross-linked particle exhibiting melting points lying within the range from about 107° to 124° C. should be employed for attaining a self-expandability of 1.3 or more.

In FIG. 7, the estimated values of expansion ratio (B) given in Table 3 are plotted against those of compressive stress (F).

From FIG. 7, it is to be recognized, that even by an expanded cross linked particle having a melting point lying in the range of about 107° to 124° C., a self-expandability of 1.3 or greater cannot be reached, unless the internal structure of the expandable beads does satisfy the relationship $$\frac{1}{140}(566 - 10 \times B) \geq F \geq \frac{1}{140}(422 - 10 \times B),$$

in which B is a number between 20 and 40.

Thus, the range that satisfies the above condition can be given in the diagram by an area enclosed by the four straight lines connecting the four coordinate points [compressive stress, expansion ratio]:

$\alpha[2.61, 20]$ $\beta[1.59, 20]$ $\gamma[0.16, 40]$ $\delta[1.19, 40]$

EXAMPLE 4

Among the expandable beads prepared in Example 3, those of Lot Nos. 8, 10, 12, 15, 16, 18, 19, 20, 22, 24, 26, 27, 28, 29, 30, 32, 33, 35, 36, 39, 40, 41, 42, 43, 44, 45, 47, 51 and 53 were employed. The expandable beads were charged in a pressure vessel and were compressed to a volume of from 95% (corresponding to a compression of 5%) to 50% (corresponding to a compression of 50%) of the original apparent volume of the beads, by imparting to the beads an air pressure at ordinary temperature. The so compressed beads were charged as such into a closed mold having inner measures of 300×300×80 mm and provided with a small aperture and were heated with a stream of 1.2–2.0 Kg/cm² gauge for 20–30 seconds to attain a fusion welding of the beads each other. After cooling with water of about 20° C. for 30–60 seconds, the expansion-molded product was taken out of the mold and was then stored in a hot air drying oven for 6 hours to obtain final molded product. The molded products in this Example were denoted by Lot Nos. from 55 to 83 and were examined for their density, melting point, compressive stress and water absorption ratio. Also estimations as to the fusion welding of the beads, sinking, compressive creep and dimensional change ratio in time upon heating were conducted. The results are recited in Table 4, together with the attenuation coefficient and surface smoothness determined for the beads of each lot employed for the molding.

TABLE 4

| | Beads | | | Molded Product | | | | | Evaluation of Molded Product | | | | |
|---|---|---|---|---|---|---|---|---|---|---|---|---|---|
| Lot No. | Expansion Ratio (B) | Attenuation Coefficient (T×10²) | Smoothness | Expandability* | Density (D) | Melting Point | Compressive Stress (R) | Water Absorption Ratio | Thermal Fusion Welding | Sinking | Compressive Creep | Rate of Dimensional Change on Heat | Integral Appraisal |
| 55 | 20 | 1.90 | 1.068 | ● | 0.054 | 105.2 | 0.95 | 0.86 | Δ | x | x | x | x |
| 56 | 30 | 2.15 | 1.082 | ● | 0.036 | 105.4 | 0.58 | 1.12 | Δ | x | x | x | x |
| 57 | 35 | 2.83 | 10.53 | ● | 0.030 | 105.1 | 0.35 | 0.94 | Δ | x | x | x | x |
| 58 | 20 | 1.33 | 1.046 | o | 0.050 | 107.2 | 1.07 | 0.28 | O | Δ | Δ | O | O |
| 59 | 20 | 1.57 | 1.043 | o | 0.052 | 107.1 | 1.01 | 0.36 | Δ | x | Δ | x | x |
| 60 | 30 | 1.86 | 1.027 | o | 0.033 | 107.0 | 0.64 | 0.22 | O | Δ | Δ | O | O |
| 61 | 40 | 2.67 | 1.032 | o | 0.025 | 107.1 | 0.21 | 0.28 | O | Δ | Δ | O | O |
| 62 | 40 | 2.95 | 1.041 | ● | 0.025 | 107.2 | 0.14 | 0.53 | Δ | x | Δ | x | x |
| 63 | 23 | 1.35 | 1.039 | o | 0.049 | 110.0 | 1.09 | 0.25 | O | O | O | O | ◉ |
| 64 | 33 | 1.96 | 1.036 | o | 0.033 | 110.1 | 0.76 | 0.16 | O | O | O | O | ◉ |
| 65 | 19 | 0.93 | 1.042 | ● | 0.053 | 113.0 | 1.28 | 0.42 | Δ | x | Δ | Δ | Δ |
| 66 | 21 | 1.12 | 1.029 | o | 0.050 | 113.0 | 1.17 | 0.27 | O | O | O | O | ◉ |

TABLE 4-continued

| Lot No. | Beads Expansion Ratio (B) | Beads Attenuation Coefficient (T×10²) | Smoothness | Molded Product Expandability* | Density (D) | Melting Point | Compressive Stress (R) | Water Absorption Ratio | Thermal Fusion Welding | Sinking | Compressive Creep | Rate of Dimensional Change on Heat | Integral Appraisal |
|---|---|---|---|---|---|---|---|---|---|---|---|---|---|
| 67 | 25 | 1.50 | 1.041 | o | 0.040 | 112.9 | 0.96 | 0.18 | O | O | O | O | ◎ |
| 68 | 30 | 2.28 | 1.038 | o | 0.035 | 112.7 | 0.61 | 0.41 | Δ | x | Δ | Δ | Δ |
| 69 | 30 | 1.61 | 1.039 | o | 0.034 | 112.8 | 0.82 | 0.12 | O | O | O | O | ◎ |
| 70 | 39 | 2.39 | 1.026 | o | 0.025 | 113.0 | 0.40 | 0.24 | O | O | O | O | ◎ |
| 71 | 42 | 2.67 | 1.043 | ● | 0.023 | 113.2 | 0.34 | 0.43 | Δ | x | Δ | Δ | Δ |
| 72 | 22 | 1.18 | 1.033 | ó | 0.050 | 120.1 | 1.32 | 0.26 | O | O | O | O | ◎ |
| 73 | 32 | 1.73 | 1.034 | o | 0.033 | 119.8 | 0.91 | 0.27 | O | O | O | O | ◎ |
| 74 | 20 | 0.80 | 1.035 | o | 0.050 | 123.9 | 1.39 | 0.26 | Δ | O | O | O | O |
| 75 | 21 | 0.75 | 1.044 | ● | 0.052 | 123.7 | 1.45 | 0.34 | Δ | x | Δ | Δ | Δ |
| 76 | 28 | 1.46 | 1.042 | o | 0.033 | 123.7 | 0.95 | 0.23 | Δ | O | Δ | O | O |
| 77 | 30 | 2.07 | 1.056 | ● | 0.040 | 123.9 | 1.25 | 0.72 | Δ | x | Δ | Δ | Δ |
| 78 | 31 | 2.12 | 1.046 | o | 0.036 | 123.6 | 1.09 | 0.35 | Δ | x | Δ | Δ | Δ |
| 79 | 40 | 1.60 | 1.044 | o | 0.025 | 124.0 | 0.53 | 0.25 | Δ | O | Δ | O | O |
| 80 | 41 | 1.56 | 1.032 | ● | 0.025 | 123.9 | 0.59 | 0.32 | x | x | Δ | Δ | x |
| 81 | 18 | 0.79 | 1.030 | ● | 0.058 | 127.3 | — | — | — | — | — | — | x |
| 82 | 30 | 2.51 | 1.045 | ● | 0.035 | 127.3 | 1.27 | — | x | x | — | — | x |
| 83 | 40 | 3.10 | 1.026 | ● | 0.27 | 127.2 | — | — | — | — | — | — | x |

*full circle corresponds to values less than 1.30 and vacant circle represents values of not lower than 1.30

The data in Table 4 indicates, that molded products acquiring higher integral appraisal is, in a first approximation, based on beads having self-expandability of not lower than 1.3 and surface gloss of not higher than 1.05.

In FIG. 8, the relation between the expansion ratio (B) and the attenuation coefficient (T) of the beads given in Table 4 is plotted in diagram.

FIG. 8 shows that molded products having higher integral appraisal exhibit expansion ratio in the range from 20 to 40 and attenuation coefficient (T) of the pressure of internal air compressed into the beads of in the range from (1/1,500)B to (1/2,500)B.

FIG. 11 is diagram, in which the relationship between the values of density (D) and of the compressive stress (R) of the molded products given in Table 4 is plotted.

FIG. 11 shows that molded products exhibiting water absorption ratio not higher than 0.3% by volume have densities (D) lying in the range from 0.025 to 0.05 g/cm³ and they are included in the sectorial area enclosed by the four lines in the diagram connecting the four points expressed by the coordinate [D, R] of α[0.025, 0.54], β[0.050, 1.39], γ[0.025, 0.21] and δ[0.050, 1.07]. It is also seen, that the molded products satisfying the above relationship have melting points ranging from 107° to 124° C. Here, the preferable range is, judging especially from the integral appraisal of the molded products, between 110° and 120° C.

EXAMPLE 5

Among the expanded beads prepared in Example 3, those of Lot Nos. 26 and 30 were employed. The expanded beads were charged either in a closing mold having inner measures of 300×300×50 mm for producing foamed plank or in a closing mold for producing a foamed container, provided therein with 9 partition projects of 28 mm high and 5 mm thick at an interval of 15 mm which are placed in parallel to the length side and with 4 partition projects of the same size at an interval of 38 mm which are placed in parallel to the width side, under such a condition, that there appeared almost no compression. The charged beads were heated with a steam of 1.2-1.5 Kg/cm² gauge for 20-30 seconds to attain fusion welding of the beads with each other. After colling with water of about 20° C. for 30-40 seconds, the primary molded product was taken out of the mold and was stored in a hot air drying oven at 70° C. for 6 hours to obtain final molded product.

By the appraisal of the so obtained molded product performed as in Example 4, it was recognized, that the molded product made from beads having an expandability less than 1.30 (Lot No. 26) was inferior in the appearance both for the plank and for the container, whereas the molded product made from beads having expandability not lower than 1.30 (Lot No. 30) showed satisfactory appearance for a simple form product (plank). However, when the beads of Lot No. 30 was used as such for producing complex form molded product (container), defects such as partial falling out on ridges occurred and no satisfactory product was obtained.

From the above, it may be understood, that satisfactory molded product of simple configuration can be obtained only by selecting expanded beads having self-expandability not lower than 1.30 without incorporating special measure for increasing the expandability. Thus, the self-expandability value of 1.30 may have a critical meaning which, however, seems to offer no significance for molding complex products.

EXAMPLE 6

The molded products made from beads of Lot Nos. 55, 62, 69, 71, 73 and 77 were examined for their durability of thermal insulating ability by the evaluation method described previously.

The results obtained are summarized in Table 5 and the relationship between these data and the values of water absorption ratio of the molded products is illustrated in FIG. 19.

TABLE 5

| Lot No. | Melting Point (°C.) | Density (g/ml) | Water Absorption Ratio (Vol. %) | λ'/λ |
|---|---|---|---|---|
| 55 | 105.2 | 0.054 | 0.86 | 1.48 |
| 62 | 107.2 | 0.025 | 0.53 | 1.34 |
| 69 | 112.8 | 0.034 | 0.12 | 1.01 |
| 71 | 113.2 | 0.023 | 0.43 | 1.17 |
| 73 | 119.8 | 0.033 | 0.27 | 1.04 |

TABLE 5-continued

| Lot No. | Melting Point (°C.) | Density (g/ml) | Water Absorption Ratio (Vol. %) | λ'/λ |
| --- | --- | --- | --- | --- |
| 77 | 123.9 | 0.040 | 0.72 | 1.46 |

FIG. 19 shows that the durability of thermal insulating ability alters suddenly in the vicinity of a water absorption ratio of 0.3%, so that a water absorption ratio below 0.3% should be warranted in order to maintain the durability value unchanged. By the way, it is thereby also made clear, that molded products produced heretofore exhibit considerably inferior durability of the insulation ability.

Moreover, it is assumed from the data in Table 5 and the indication of FIG. 19, that the change of thermal insulation ability in time may not vary linearly with the water absorption ratio for molded products which are produced by fusion welding of expanded beads as in the present invention, since the distribution of water content within the molded product will be varied in accordance with water absorption ratio exhibited by the molded product (such as for example by granular distribution, parallel distribution and so on).

EXAMPLE 7

Among the molded products of Lot Nos. from 55 to 83 produced in Example 4, those of the Lot Nos. 57, 63, 69, 71, 73 and 77, which meet the condition represented by the sectorial area in the diagram of FIG. 11 that is enclosed by the four lines connecting the coordinate points α, β, γ and δ, were selected and they were examined for their surface gloss, internal water absorption ratio and cavity coefficient. The results are given in Table 6 and in FIG. 16.

TABLE 6

| Lot No. | Cavity Coefficient | Internal Water Absorption Ratio (%) | Surface Gloss (%) |
| --- | --- | --- | --- |
| 57 | 29 | 0.66 | 15.8 |
| 63 | 10 | 0.20 | 19.0 |
| 69 | 5 | 0.16 | 19.5 |
| 71 | 24 | 0.59 | 16.3 |
| 73 | 14 | 0.25 | 18.6 |
| 77 | 32 | 0.67 | 15.7 |

FIG. 16 shows that the larger cavity coefficient, the lower will be the surface gloss, while increasing the internal water absorption ratio. It is also shown, that molded product showing internal water absorption ratio and surface gloss corresponding approximately to those found in market will in general have a cavity coefficient of around 20 and molded product which may be evaluated to be particularly excellent will in general have a cavity coefficient around 5.

Cavity coefficient itself does never offer such a critical meaning that a difference of ±1 in the value plays a significant role, because the method of evaluation thereof includes a some kind of probability factor. However, it would be persuasive of that some standardizing meaning may be proposed by employing a cavity coefficient of 10, by compromising between the values of 20 and 5.

The internal water absorption ratio is defined by a percent water absorption detected from a specimen cut out of the central portion of the molded product in such a manner, that each 15 mm thickness from the center line of the section of the product in both sides (total thickness is 30 mm) will be left in the specimen by the cutting.

Enlarged photographs of cut face of molded product in the central portion were taken for the molded products of Lot Nos. 57 and 69 employed in this Example, which are shown in FIGS. 10 and 15 and in FIGS. 9 and 14, respectively. These photographs suggest that molded product exhibiting smaller cavity coefficient, i.e. the product of Lot No. 69, is constituted, in the inner portion thereof, of expanded beads having thicker skin layer than that of molded product exhibiting greater cavity coefficient, i.e. the product of Lot No. 57, and that the welding of beads with each other is also stronger than the latter.

The skin layer thickness of the beads constituting the molded product reaches, basing on the standard scale given in the photograph, in the maximum to 30μ in the portion molten together, which amounts to a value of not lower than three times of the cell membrane thickness inside the beads.

Figure 17:
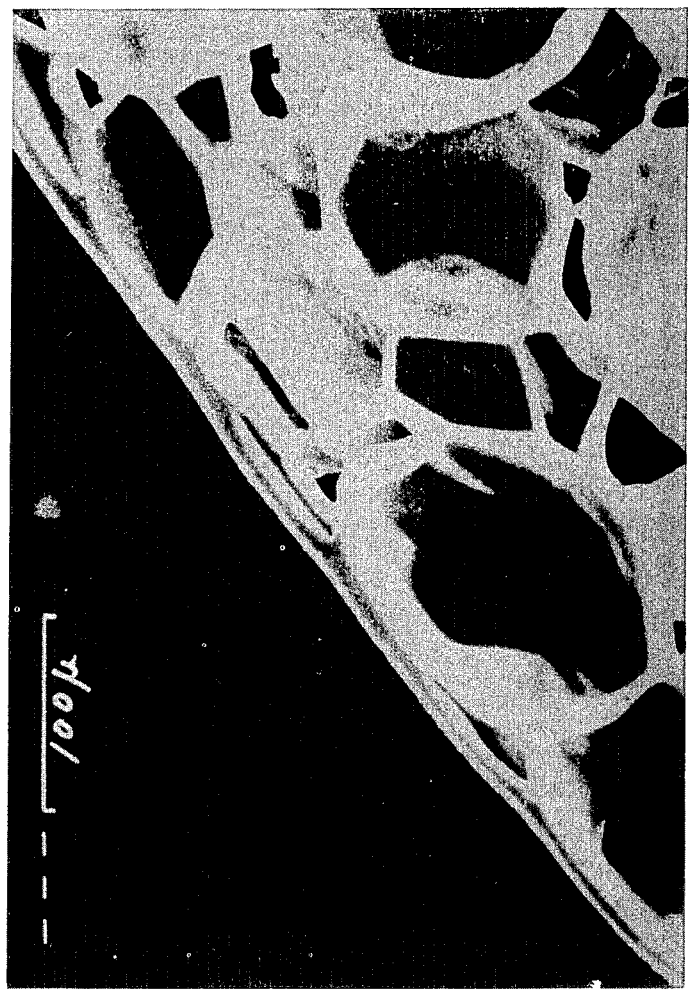
FIGS. 17 and 18 are cross sectional enlarged photographs of expanded particles, respectively.
Figure 18:
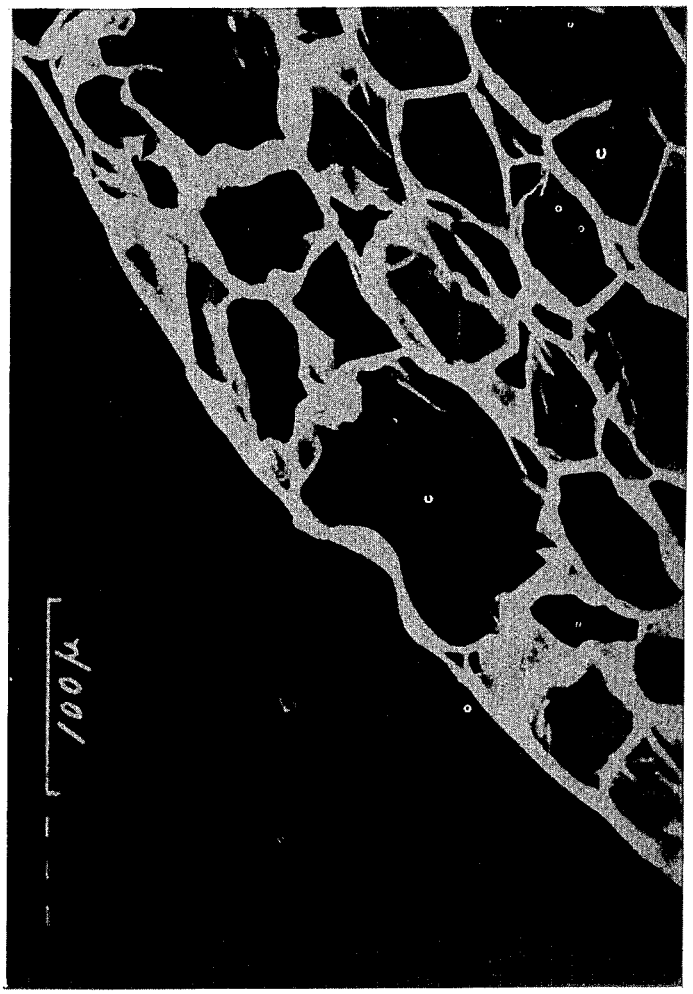

Besides, each an enlarged photograph of section of expanded bead was taken for the beads of Lot Nos. 57 and 69 which are shown in FIGS. 17 and 18.

In these photographs the difference of the thickness of skin layer of bead explained above with respect to the beads in the molded products can be recognized more clearly.

Thus, in the photograph of FIG. 17, the thickness of surface skin layer is quite different from that of cell membrane inside the bead and can be estimated by the standard scale given therein the amount, at the maximum, to 15 μ, whereas, according to the photograph of FIG. 18, this thickness amounts only about 8 μ or so. The photograph of FIG. 17 shows that the skin layer of bead is as thick as at least three times of the cell membrane inside the bead. In this photograph, an extremely small cell can be seen among the cells constituting the surface portion, which may supposedly be due to the insufficient restraint of the foaming gas upon expanding, resulting in a premature evanescence of gas.

COMPARISON EXAMPLE 1

In a pressure vessel, there were charged 180 parts by weight of water containing 0.25 part by weight of potassium phosphate prepared from an aqueous solution of sodium phosphate and an aqueous solution of potassium chloride. Thereto was added under agitation an aqueous mixture, which was prepared by admixing 0.38 part by weight of dicumyl peroxide of 20 parts by weight of water containing 0.1 part by weight of Neoperex while heating so as to obtain a fine dispersion. Thereto were further added 100 parts by weight of a low density granular polyethylene having a particle size of 2.5 mm (a product of the firm Mitsui Polychemical with a trade mark of Milathon 9). After a gas replacement of the vessel with nitrogen, the vessel contents were treated by heating first at 100° C. for 2 hours and then at 135° C. for 7 hours. A granular cross linked polyethylene having a gel ratio of about 50% was obtained.

(I) This cross linked granular polyethylene was charged in a pressure vessel and was treated so as to impregnate it with dichlorodifluoromethane up to a content of 12% to prepare heat expandable beads. The beads were then retained under a gaseous atmosphere of dichlorodifluoromethane at a pressure of 18 Kg/cm². By relieving the pressure, expanded beads having an apparent specific volume of about 45 ml/g were obtained. The so obtained expanded beads were then charged in a pressure vessel in an amount of either 5,000 ml, 5,625 ml or 6,430 ml and this charge was then compressed by a compressed air of a pressure of either 1.0, 1.2 or 1.5 Kg/cm² gauge respectively, so as to reach a charge volume of either 4,000, 4,050 or 4,050 ml, respectively. Each of these charges was then introduced into a mold having inner dimensions of 300 mm×300 mm×50 mm (inner volume 4,500 cm³). After heating with a steam of 2.5 Kg/cm² gauge, a molded product was obtained for each charge. The molded products obtained are denoted by Lot Nos. 84, 85 and 86, respectively.

(II) The cross linked granular polyethylene prepared previously was charged in a pressure vessel and was treated under pressure with dichlorodifluoromethane at 60° C. for 2 hours so as to obtain impregnated beads containing the foaming agent up to 13.5% by weight. The so obtained beads were heated with steam of 1.2 Kg/cm² gauge for 20 seconds to obtain expanded beads having an apparent specific volume of about 18 ml/g. The expanded beads were then charged in a pressure vessel and were retained in a compressed air of 18 Kg/cm² gauge at 75° C. for a period of either 15, 20 or 25 minutes. After relieving to the atmospheric pressure, expanded beads having an apparent specific volume of about 27 ml/g were obtained. The average inner gas pressure inside the beads so prepared was found to be 0.43, 0.84 and 1.22 Kg/cm² gauge, respectively. The expanded beads so prepared were charged at once into a mold having inner dimensions of 300 mm ×300 mm×50 mm (inner volume 4,500 cm³) and were heated with a steam of 1.9 Kg/cm² gauge for 20 seconds to produce a molded product. The molded products obtained hereby are denoted by Lot Nos. 87, 88 and 89, respectively.

The molded products of Lot Nos. from 84 to 89 were examined for the melting point of the cell membrane thereof, density, compressive stress at 25% compression and cavity coefficient. The results are summarized in Table 7.

The inner gas pressure of bead given herein was determined in such a manner, that five water column vessels were charged each with about 10 g of the expanded beads quickly after they had been taken out of the compressed atmosphere. Each vessel was then weighed accurately to determine the actual weight ($W_i$) of the beads contained. Then, the vessels were connected each to each of 5 water meniscus tubes having one end open to the atmospheric air, whereby the amount ($V_g$) of gas dissipating from the expanded beads was periodically measured. The inner gas pressure was calculated by the following equation:

$$\text{Inner Gas Pressure} = \frac{V_g}{V_s - (W_i/D)} \ (Kg/Cm^2)$$

Here, the symbol D represents the density of the polyethylene employed and $V_s$ is the volume of the expanded beads calculated from the observed weight of the expanded beads using a conversion coefficient between weight and volume determined preliminarily using large number of samples taken from the same population. By taking average of the five measurements, the inner gas pressure is determined. Besides, the measurement was terminated when the difference between two inner gas pressure values observed by two successive measurements at an interval of 1 hour became less than 0.01 Kg/cm².

TABLE 7

| Lot No. | Melting Point (°C.) | Density (g/cc) | Compressive Stress | Cavity Coefficient |
|---|---|---|---|---|
| 84 | 104.2 | 0.046 | 0.92 | 32 |
| 85 | 104.5 | 0.040 | 0.71 | 24 |
| 86 | 104.7 | 0.036 | 0.58 | 21 |
| 87 | 104.3 | 0.037 | 0.65 | 23 |
| 88 | 104.2 | 0.033 | 0.47 | 18 |
| 89 | 104.6 | 0.031 | 0.26 | 15 |

From Table 7, it can be recognized, that molded products produced by conventional molding process lie outside the technical scope according to the present invention with respect to the melting point, relationship between the density and the compressive stress and the cavity coefficient.

EXAMPLE 8

The molded product of Lot No. 69 of Example 4 and the molded products of Lot Nos. 85 and 89, a buffering plank (size: 900 mm×1,200 mm×50 mm; expansion ratio: 30 times) manufactured by the firm X and a buffering plank (size: 900 mm×1,200 mm×50 mm; expansion ratio: 29 times) manufactured by the firm Y were examined for the melting point of the cell membrane inside the bead, apparent density, compressive stress, cavity coefficient, fusion welding of the beads, water absorption ratio, sinking, rate of dimensional change on heat, compressive creep, thermal resistant creep, surface gloss and durability of thermal insulating property. The results are summarized in Table 8.

TABLE 8

| Lot No. | Melting Point (°C.) | Density (g/ml) | Compres. Stress (Kg/cm²) | Cavity Coefficient | Fusion Welding | Water Absorp. Ratio (vol. %) | Sinking | Rate of Dimemsional Change on Heat | Compres. Creep | Thermal Resist. Creep | Surface Gloss | Durability of Heat Insul. Ability | Integral Appraisal |
|---|---|---|---|---|---|---|---|---|---|---|---|---|---|
| 69 | 112.8 | 0.034 | 0.82 | 5 | ○ | ○ | ○ | ○ | ○ | ○ | ○ | ○ | ⊚ |
| 85 | 104.5 | 0.040 | 0.71 | 24 | Δ* | x* | x | x | Δ | Δ | x | x | x |
| 89 | 104.2 | 0.031 | 0.26 | 15 | Δ* | x* | Δ | x | x | Δ | Δ | x | Δ |
| X | 104.8 | 0.033 | 0.53 | 26 | Δ* | x* | x | x | x | Δ | x | x | x |
| Y | 105.2 | 0.034 | 0.58 | 31 | Δ* | x* | x | x | x | Δ | x | x | x |

*determined using a specimen having a size of 300 × 300 × 30 mm in accordance with the procedure described previously.

From Table 8, it is clear, that the molded products according to the present invention are far excellent as compared with conventional products in all properties.

As for the molded product of Lot No. 69 according to the present invention, the buffer plank of firm X and the buffer plank of firm Y, the unprocessed data for dimensional change ratio on heat, thermal resistant compressive creep, surface gloss, durability of thermal insulating property and cushioning property are given in FIGS. 20, 21, 22, 23 and 24 respectively as diagram, in which I denotes the product according to the present invention (Lot No. 69), II indicates the buffer plank of firm X and II' represents the buffer plank of firm Y.

EXAMPLE 9

The resin D having a particle size of about 1.2 mm was impregnated with dicumyl peroxide to a content of 0.4%. The so treated resin was heated at 150° C. to obtain a cross linked granular polyethylene having a gel ratio of 60%. This cross linked polyethylene was impregnated with dichlorodifluoromethane up to a content of about 12% to obtain expandable cross linked polyethylene beads. The so obtained beads were divided into two lots J and K. The beads J were introduced as such directly into the expanding apparatus, where the beads were converted into expanded beads (primary expansion) having an expansion ratio of 8, by heating them with steam at a temperature elevation rate permitting to reach at 115° C. in 10 seconds. The primary expanded beads were then stored in a compressed air of 5 Kg/cm² gauge at 80° C. for 6 hours, followed by heating with steam at a temperature elevation rate of 4° C./sec. so as to reach a temperature of 115° C. to obtain expanded beads having an expansion ratio of 17 (secondary expansion). Thereafter, the secondary expanded beads were further subjected to the treatment of air impregnation and heat expansion under the same condition (third expansion) to obtain expanded beads (Ⓙ) having an expansion ratio of about 30 times.

On the other hand, the expandable beads Ⓚ were treated by the procedures, which were identical with those for the expanded beads Ⓙ except that the expandable beads were once exposed to the atmospheric air for 6 minutes before they were introduced into the expanding apparatus, whereby expanded beads Ⓚ having an expansion ratio of about 30 times were obtained.

Minute observation of these two kinds of expanded beads showed, that the structure and the property of the both beads Ⓙ and Ⓚ are quite close to those of the starting expanded beads for producing the molded products of Lot Nos. 57 and 69 in Example 4 respectively. Thus, the beads Ⓚ are covered with thick skin layer having high gloss, whereas the beads Ⓙ only thin surface layer with low gloss.

Using these expanded beads Ⓙ and Ⓚ, molded products of following particulars were prepared:

Molded Product III: A plank with a thickness of 100 mm.

Molded Product IV: A rectangular container of 470 mm long, 265 mm wide and 300 mm high, with wall thickness of about 14 mm.

Molded Product V: A rectangular container of 200 mm long, 155 mm wide and 48 mm high, furnished inside with 9 partition to width side and 4 partition to length side projections of 5 mm thick and 28 mm high disposed at an interval of 15 mm and 38 mm respectively so as to form a rack.

Molded Product VI: A stream-lined machine cover of 270 mm long, 210 mm wide and 140 mm high, with wall thickness mostly of about 10 mm.

The molding was performed by selecting an optimum condition within the following particulars:

| | |
|---|---|
| Degree of Compression of Bead: (for bestowing an expandability in the mold) | 5–35% (up tp 95 – 65% of the original apparent volume) |
| Heating Temperature within the Mold: (maximum gauge pressure of steam) | 1.2–1.5 Kg/cm² |
| Time of Heating in the Mold: | 10–15 sec. |
| Time of Cooling in the Mold: | 30–40 sec. |
| Aging of the Molded Product: | 70° C., 6 hr |

Using the beads Ⓙ, no molded product comparable to the molded products with beads Ⓚ was able to attain, even if any possible condition was chosen.

The results of evaluation of various properties for these molded products of both the bead Ⓙ and Ⓚ, which were obtained by molded products showing best appearance, are recited in Table 9.

TABLE 9

| Expanded Beads Employed | Molded Product | Melting Point | Density (g/ml) | Compres.* Stress at 25% Compression (Kg/cm²) | Cavity Coefficient | Thermal Resist. Compressive Creep (%) | Dimensional Change Ratio on Heat (%) | Note |
|---|---|---|---|---|---|---|---|---|
| Ⓚ | III | 113.1 | 0.034 | 0.82 | 4 | 32.2 | 0.83 | Low density; favorable surface with gloss |
| | IV | 113.2 | 0.036 | 0.84 | 6 | 30.4 | 1.21 | With uniform density over the entire surface; having gloss; sharp contour also at the edge far from the beads feeder |
| | V | 112.8 | 0.042 | 1.02 | 4 | 30.1 | 0.74 | Dense distribution of beads at thin edge portion; having gloss |
| | VI | 113.0 | 0.045 | 1.14 | 5 | 28.6 | 0.74 | Almiost no cavity nor defect at thin thickness portion; having gloss |
| Ⓙ | III | 113.0 | 0.039 | 0.84 | 27 | 31.5 | 0.96 | Relatively greater number of cavities on the surface in |

TABLE 9-continued

| | | Evaluations of Molded Product | | | | | |
|---|---|---|---|---|---|---|---|
| Expanded Beads Employed | Molded Product | Melting Point | Density (g/ml) | Compres.* Stress at 25% Compression (Kg/cm$^2$) | Cavity Coefficient | Thermal Resist. Compressive Creep (%) | Dimensional Change Ratio on Heat (%) | Note |
| | IV | 112.9 | 0.042 | 0.87 | 32 | 29.6 | 0.85 | spite of high density; no gloss Fluctuation of numbers of cavities between the beads in accordance with the distance from the feeder; no gloss |
| | V | 113.1 | 0.055 | 1.24 | 24 | 27.3 | 0.79 | No gloss; gap of beads filling at the edge of thinner parts (not available for practical use) |
| | VI | 113.1 | 0.048 | 1.08 | 35 | 26.7 | 0.66 | Holes in thinner portion; no gloss (not available for practicle use) |

*determined by sampling from thick-walled part of the molded product, so as to cut out a specimen in maximum size From Table 9, it is seen, that the density (D), compressive stress (F) and cavity coefficient of the molded products will vary according to the structure of the desired product, even though an identical lot of expanded beads is employed.

However, by the expanded beads Ⓚ which are close to that of Lot No. 69, it has been found, that molded product with configurations which was heretofore considered to be difficult to obtain can be produced with favourable appearance without deteriorating requisite characteristics by the process according to the present invention.

The thus produced molded products III, IV, V and VI made of the beads Ⓚ are novel and propose greater utility value, which have long been desired.

EXAMPLE 10

Using the same expanded beads Ⓙ and Ⓚ as in Example 9, various starting beads having increased cell inner gas pressure ranging from 0.05 to 2.5 Kg/cm$^2$ gauge were prepared by retaining the expanded beads in a compressed air for required period of time. The so prepared starting beads were expansion-molded under the same molding conditions as in Example 9. The molded products obtained were examined for their properties. Comparison of these data showed that, as in Example 9, the molded products of expanded beads Ⓚ were far superior to those of expanded beads Ⓙ.

EXAMPLE 11

In order to estimate the effect of aging treatment according to the present invention, 21 pieces of foamed block of 50 mm cube were molded under the same molding conditions as in Example 9. After taken out of the mold, the block was subjected to either one of the following aging treatment:

(1) without aging (2) The block is retained in a constant temperature chamber adjusted at 50° C. for either 4, 6, 8, 10 or 12 hours.

(3) The block is retained in a constant temperature chamber adjusted at 60° C. for either 4, 6, 8, 10 l or 12 hours.

(4) The block is retained in a constant temperature chamber adjusted at 70° C. for either 4, 6, 8, 10 or 12 hours.

(5) The block is retained in a constant temperature chamber adjusted at 80° C. for either 4, 6, 8, 10 or 12 hours.

The results are given in FIG. 25 as a diagram showing the relationship between the treating time and the molded-product dimensional change ratio.

Here, the molded-product dimensional change ratio was determined by taking the block out of the constant temperature chamber after the predetermined residence time has elapsed and cooled by standing it under normal pressure at ordinary temperature for 4 hours before the measurement of the dimensional change thereof, except the condition (1). As for the production of condition (1), the measurement was carried out directly after taking out the molded block from the mold.

As is clear from this diagram, it is necessary to incorporate heat treatment after the molding, in order to obtain a molded product dimensional change ratio close to 1.0. Here, a heating condition of a temperature of 60° C. or higher and a heating time of 6 hours or more, preferably a temperature of 80° C. and a heating time of 8 hours or more should be employed.

EXAMPLE 12

For the expanded beads prepared in Examples 1 and 2 (Lot Nos. 2, 4, 5 and 6), the expansion condition is recited in Table 10 together with the surface smoothness (S), expandability and attenuation coefficient of the expanded beads.

TABLE 10

| Lot No. | Condition of Primary Expan. | | | | Addi-tional Ex-pan-sion | Break Ex-pan-sion Ratio (B) | Bead Surf. Smooth-ness (S) | Ex-pand-abi-lity | Atten-uation Co-effi-cient (T × 10²) |
|---|---|---|---|---|---|---|---|---|---|
| | At-mos-pher-ic Expo-sure Time (min) | Tem-pera-ture Ele-va-tion Time (sec) | Ex-pand-ing Temp. (°C.) | Ex-pand-ing Time (sec) | | | | | |
| 1 | 8 | 10 | 115 | 5 | 2 | 30 | 1.026 | 1.34 | 1.84 |
| 4 | 2 | 10 | 115 | 5 | 2 | 30 | 1.072 | 1.22 | 2.03 |
| 5 | 5 | 10 | 115 | 5 | 2 | 30 | 1.050 | 1.31 | 1.86 |
| 6 | 10 | 10 | 115 | 5 | 2 | 30 | 1.013 | 1.36 | 1.52 |

From Table 10, it is seen, that the expanded beads of Lot No. 4 is out of the technical scope of the present invention both in the surface smoothness, expandability and attenuation coefficient, which is also unsatisfactory in the surface gloss.

The expanded beads of Lot Nos. 1, 5 and 6 fall under the scope of the present invention in surface smoothness, expandability and attenuation coefficient.

Taking into account of the efficiency of manufacturing, the time of atmospheric exposure should be as short as possible. On the contrary, the manufacturing conditions should preferably be chosen to permit a possible fluctuation of each process step. For these reasons, an atmospheric exposure time of about 5–10 minutes may be adequate.

For volatilizing the organic foaming agent near the surface of the bead, a measure of controlling the time of temperature elevation from the introduction into the expanding apparatus to reach at the expanding temperature was adopted.

Thus, settling the rate of temperature elevation at 1° C./sec, 2° C./sec or 6° C./sec, the expanded beads obtained by the elevation rates of 1°, 2° and 3° C./sec corresponded in the appraisal of the quality to those employing exposure times of 10, 8 and 5 minutes respectively, while the expanded beads of temperature elevation rate of 6° C./sec corresponded to those employing an exposure time of 2 minutes.

Thus, it can be seen, that a rate of temperature elevation for expansion of about 1–3° C./sec may be suitable for realizing the process according to the present invention.

From all the experimental results described above, it is made clear, that the present invention proposes expansion molded products which are excellent not only in the thermal resisting ability represented by such as the dimensional change ratio on heat, the thermal resistant compressive creep and so on, but also in the appearance such as smoothness and gloss and durability of the thermal insulating ability as well as the cushioning property, what will contribute to the industry markedly, since expansion molded products which have not been found hitherto can thus be produced by the process according to the present invention.

We claim:

1. An expansion-molded product of cross-linked polyethylene, said expansion-molded product:
   (1) being a number of expanded cross-linked polyethylene particles having a thick skin layer, which particles are closely contacted and adhered to each other at the skin layers of adjacent particles to form a foam having a density of 0.025 to 0.05 g/cm³,
   (2) having a substantial average thickness of the interfacial membranes, which are formed by thermally fusing and welding the particle surfaces together, being approximately not lower than 3 times the thickness, as compared with the substantial average thickness of cell membranes in each particle,
   (3) having a melting point of 107° to 124° C.,
   (4) having a compressure stress (R) kg/cm² required for 25% compression which satisfies the equation:

$$1/140\,(270-6/D) \leq R \leq 1/140\,(315-6/D)$$

wherein D means density g/cm³,
   (5) having a cavity coefficient, which represents smoothness of the surface of the product, if not higher than 10,
   (6) having a water absorption ratio of not higher than 0.3% by volume,
   (7) having a head resistant compressive creep at 80° C. of not higher than 35% by thickness, and
   (8) having a dimensional change ratio after standing at 90° C. for 96 hours of not higher than 2% by length.

2. The expansion-molded product as defined in claim 1, wherein the melting point of the product is approximately 110° to 120° C.

3. An exapansion-molded product of cross-linked polyethylene, said expansion-molded product:
   (1) being a number of expanded cross-linked polyethylene particles having a thick skin layer, which particles are closely contacted and adhered to each other at the skin layers of adjacent particles to form a foam having a density of 0.025 to 0.05 g/cm³,
   (2) having a substantial average thickness of the interfacial membranes, which are formed by thermally fusing and welding the particle surfaces together, being approximately not lower than 3 times the thickness, as compared with the subsantial average thickness of cell membranes in each particle,
   (3) having a melting point of 107° to 124° C.,
   (4) having a compressure stress (R) kg/cm² required for 25% compression which satisfies the equation:

$$1/140\,(270-6/D) \leq R \leq 1/140\,(315-6/D)$$

wherein D means density g/cm³,
   (5) having a water absorption ratio of not higher than 0.3% by volume,
   (6) having a head resistant compressive creep at 80° C. of not higher than 35% by thickness, and
   (7) having a dimensional change ratio after standing at 90° C. for 96 hours of not higher than 2% by length.

* * * * *